(12) United States Patent
Fujii et al.

(10) Patent No.: US 9,623,746 B2
(45) Date of Patent: Apr. 18, 2017

(54) CONSTRUCTION MACHINE

(71) Applicant: Hitachi Construction Machinery Co., Ltd., Bunkyo-ku, Tokyo (JP)

(72) Inventors: Toshinori Fujii, Tsukuba (JP); Hidenori Mano, Tsukuba (JP); Hiroyuki Azuma, Ushiku (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 14/951,633

(22) Filed: Nov. 25, 2015

(65) Prior Publication Data
US 2016/0152131 A1   Jun. 2, 2016

(30) Foreign Application Priority Data

Nov. 28, 2014   (JP) ................................. 2014-241914

(51) Int. Cl.
| F01N 3/00 | (2006.01) |
| F01N 3/08 | (2006.01) |
| B60K 13/04 | (2006.01) |
| F01N 3/20 | (2006.01) |
| E02F 9/08 | (2006.01) |

(52) U.S. Cl.
CPC ............ *B60K 13/04* (2013.01); *E02F 9/0883* (2013.01); *F01N 3/2066* (2013.01); *B60Y 2200/412* (2013.01); *F01N 2610/02* (2013.01); *F01N 2610/1406* (2013.01); *Y02T 10/24* (2013.01)

(58) Field of Classification Search
CPC ............ F01N 2340/04; F01N 2590/08; F01N 13/1822; F01N 13/1805; B60K 13/04; B60K 13/06; B60K 11/00; B60K 11/04; B62D 25/10; B62D 25/12
See application file for complete search history.

(56) References Cited

U.S. PATENT DOCUMENTS 6,938,928 B2 * 9/2005 Pfohl ..................... B60K 15/04
                                                         180/314
8,459,014 B2 * 6/2013 Kamiya ................. B60K 13/04
                                                           60/295
(Continued)

FOREIGN PATENT DOCUMENTS

| JP | 2011-247232 A | 12/2011 |
| JP | 2014-77301 A | 5/2014 |

*Primary Examiner* — J. Allen Shriver, II
*Assistant Examiner* — Travis Coolman
(74) *Attorney, Agent, or Firm* — Crowell & Moring LLP

(57) ABSTRACT

A tank bracket (23) is formed by a bottom surface part (24) having a first frame body (24A), a second frame body (24B), a third frame body (24C), and a fourth frame body (24D), a first side surface part (25) supported by the first frame body (24A) of the bottom surface part (24) and provided in a vertical direction, and a second side surface part (26) supported by the second frame body (24B) and provided in the vertical direction, and a female screw hole (24E) is provided in the bottom surface part (24). A fixing band (28) for fixing a reduction agent tank (22) is provided on the tank bracket (23). On this, the tank bracket (23) is fixed to an undercover (14) of a revolving frame (5) by using each of the female screw holes (24E) of the bottom surface part (24) in a state in which the reduction agent tank (22) is sandwiched between the second side surface part (26) and a right side frame (11) of the revolving frame (5).

4 Claims, 18 Drawing Sheets

(56) References Cited

U.S. PATENT DOCUMENTS

| | | | | |
|---|---|---|---|---|
| 8,695,827 B2* | 4/2014 | Klauer | ............... | B60K 13/04 |
| | | | | 141/369 |
| 8,708,087 B2* | 4/2014 | Kashu | ............... | B60K 13/04 |
| | | | | 180/291 |
| 8,973,692 B1* | 3/2015 | Okuda | ............... | B60L 11/1877 |
| | | | | 180/68.5 |
| 9,027,697 B2* | 5/2015 | Kobayashi | ............... | E02F 9/0875 |
| | | | | 180/296 |
| 9,061,582 B2* | 6/2015 | Sawada | ............... | B60K 13/04 |
| | | | | 180/309 |
| 9,187,877 B2* | 11/2015 | Imano | ............... | E02F 9/0866 |
| 9,194,104 B2* | 11/2015 | Kanamori | ............... | B60R 3/00 |
| 9,217,236 B2* | 12/2015 | Yamashita | ............... | F01N 3/2066 |
| 9,255,382 B2* | 2/2016 | Noda | ............... | E02F 9/16 |
| 9,267,268 B2* | 2/2016 | Arai | ............... | B60K 15/063 |
| 9,316,136 B2* | 4/2016 | Kobayashi | ............... | B60K 13/04 |
| 2009/0188923 A1* | 7/2009 | Versaw, Jr. | ............... | B60K 13/04 |
| | | | | 220/564 |
| 2010/0038162 A1* | 2/2010 | Kamiya | ............... | B01D 53/9431 |
| | | | | 180/69.6 |
| 2010/0186382 A1* | 7/2010 | Schroeder | ............... | F01N 3/025 |
| | | | | 60/286 |
| 2010/0186394 A1* | 7/2010 | Harrison | ............... | F01N 3/103 |
| | | | | 60/299 |
| 2010/0266458 A1* | 10/2010 | Takeshita | ............... | E02F 9/0866 |
| | | | | 422/109 |
| 2010/0275588 A1* | 11/2010 | Kamata | ............... | B60K 5/1208 |
| | | | | 60/322 |
| 2012/0012731 A1* | 1/2012 | Johnson | ............... | F01N 13/1822 |
| | | | | 248/638 |
| 2012/0017574 A1* | 1/2012 | Hasan | ............... | F01N 13/1805 |
| | | | | 60/297 |
| 2013/0071295 A1* | 3/2013 | Terakawa | ............... | E02F 9/0858 |
| | | | | 422/168 |
| 2014/0202142 A1* | 7/2014 | Hertsgaard | ............... | B60R 16/08 |
| | | | | 60/303 |
| 2014/0202785 A1* | 7/2014 | Hanashima | ............... | F01N 13/08 |
| | | | | 180/309 |
| 2014/0318882 A1* | 10/2014 | Sawada | ............... | B60K 13/04 |
| | | | | 180/309 |
| 2014/0348716 A1* | 11/2014 | Park | ............... | F01N 3/2066 |
| | | | | 422/171 |
| 2015/0016932 A1* | 1/2015 | Azuma | ............... | E02F 9/0833 |
| | | | | 414/687 |
| 2015/0192052 A1* | 7/2015 | Ogawa | ............... | F01N 3/208 |
| | | | | 60/295 |
| 2015/0198074 A1* | 7/2015 | Mori | ............... | F01N 3/2066 |
| | | | | 60/286 |
| 2015/0240448 A1* | 8/2015 | Mori | ............... | E02F 9/0808 |
| | | | | 701/50 |
| 2015/0299983 A1* | 10/2015 | Okamoto | ............... | E02F 9/0883 |
| | | | | 180/296 |
| 2015/0329242 A1* | 11/2015 | Miyamoto | ............... | B60K 13/04 |
| | | | | 248/313 |
| 2016/0082829 A1* | 3/2016 | Hummel | ............... | B60K 13/04 |
| | | | | 248/315 |
| 2016/0265405 A1* | 9/2016 | Nakano | ............... | F01N 3/2066 |

\* cited by examiner

CONSTRUCTION MACHINE

TECHNICAL FIELD

The present invention relates to a construction machine such as a hydraulic excavator and the like on which a reduction agent tank storing a liquid reduction agent such as urea water and the like is mounted, for example.

BACKGROUND ART

In general, a hydraulic excavator which is a typical example of a construction machine is configured by an automotive lower traveling structure and an upper revolving structure rotatably mounted on the lower traveling structure, and a working mechanism liftably provided on a front side of the upper revolving structure.

The upper revolving structure is configured by a revolving frame forming a support structural body, an engine mounted on the revolving frame, an exhaust gas post-treatment device connected to an exhaust side of the engine and performing post-treatment of an exhaust gas exhausted from the engine, and a reduction agent tank storing a reduction agent to be supplied to the exhaust gas post-treatment device (Patent Document 1).

PRIOR ART DOCUMENT

Patent Document

Patent Document 1: Japanese Patent Laid-Open No. 2011-247232 A

SUMMARY OF THE INVENTION

Incidentally, the conventional art according to the aforementioned Patent Document 1 is configured such that the reduction agent tank is installed in a storage box. In this case, the reduction agent tank needs to be reliably fixed so as not to move by vibration during running or in a work. However, the reduction agent tank is formed as a tank made of resin in many cases and cannot be directly fixed by using a screw member.

Thus, in case of fixing the reduction agent tank, the number of components relating to the fixation increases, and a fixing structure is complicated and thus, there are problems of lowering of assembling workability and a rise of a manufacturing cost.

In view of the aforementioned problems with the prior art, it is an object of the present invention to provide a construction machine in which the reduction agent tank can be fixed to a vehicle body frame with a simple structure and an easy work and improvement of the assembling workability and reduction of a manufacturing cost are realized.

A construction machine according to the present invention includes a vehicle body frame forming a support structural body of a vehicle body, an engine mounted on the vehicle body frame, an exhaust gas post-treatment device connected to an exhaust side of the engine and performing post-treatment of an exhaust gas exhausted from the engine, and a reduction agent tank storing a reduction agent to be supplied to the exhaust gas post-treatment device.

In order to solve the aforementioned problems, a characteristic feature of a configuration employed by the present invention is such that a tank bracket holding the reduction agent tank on the vehicle body frame is provided; the tank bracket is formed by a square-shaped bottom surface part having a first frame body, a second frame body, a third frame body, and a fourth frame body, a first side surface part supported by the first frame body of the bottom surface part and provided in a vertical direction, and a second side surface part supported by the second frame body adjacent to the first frame body in each of the frame bodies of the bottom surface part, provided in the vertical direction, and forming an L-shaped wall surface in collaboration with the first side surface part, the tank bracket includes a bracket fixing portion located on the bottom surface part and fixing the tank bracket to the vehicle body frame, a fixing band connecting one side surface part in the first side surface part and the second side surface part to one frame body in the first to fourth frame bodies forming the bottom surface part facing the one side surface part sandwiching the reduction agent tank and fixing the reduction agent tank between the bottom surface part and the one side surface part is provided in the tank bracket, the tank bracket is fixed to the vehicle body frame by the bracket fixing portion in a state in which the reduction agent tank is sandwiched by the one side surface part and a part of the vehicle body frame or a member mounted on the vehicle body frame.

According to the present invention, the reduction agent tank can be fixed to the vehicle body frame with a simple structure and an easy work, whereby improvement of the assembling workability and reduction of a manufacturing cost can be realized.

MODE FOR CARRYING OUT THE INVENTION

Hereinafter, an embodiment of a construction machine according to the present invention will be explained in detail with reference to the attached drawings, by taking a crawler-type hydraulic excavator as an example.

FIG. 1 to FIG. 13 show a first embodiment of the present invention. In this first embodiment, a configuration in which a reduction agent tank is fixed by using a right side frame forming a revolving frame is exemplified.

Figure 1:
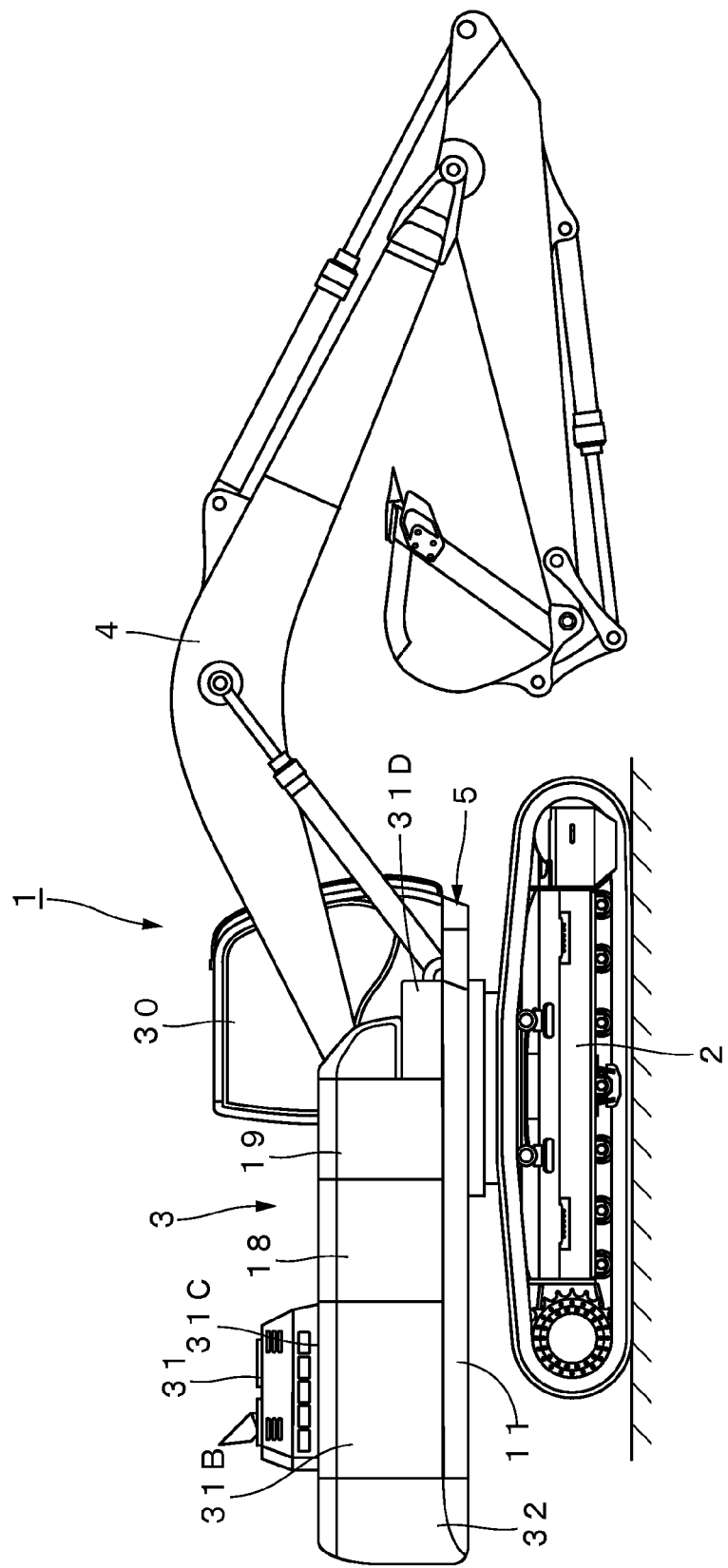
FIG. 1 is a front view showing a hydraulic excavator applied to a first embodiment of the present invention.

In FIG. 1, a hydraulic excavator 1 constitutes a crawler-type construction machine. This hydraulic excavator 1 is configured by an automotive crawler-type lower traveling structure 2, an upper revolving structure 3 mounted rotatably on the lower traveling structure 2 and forming a vehicle body with the lower traveling structure 2, and a working mechanism 4 provided liftably on a front side in a front-rear direction of the upper revolving structure 3 and performing an excavating work of earth and sand and the like.

Figure 2:
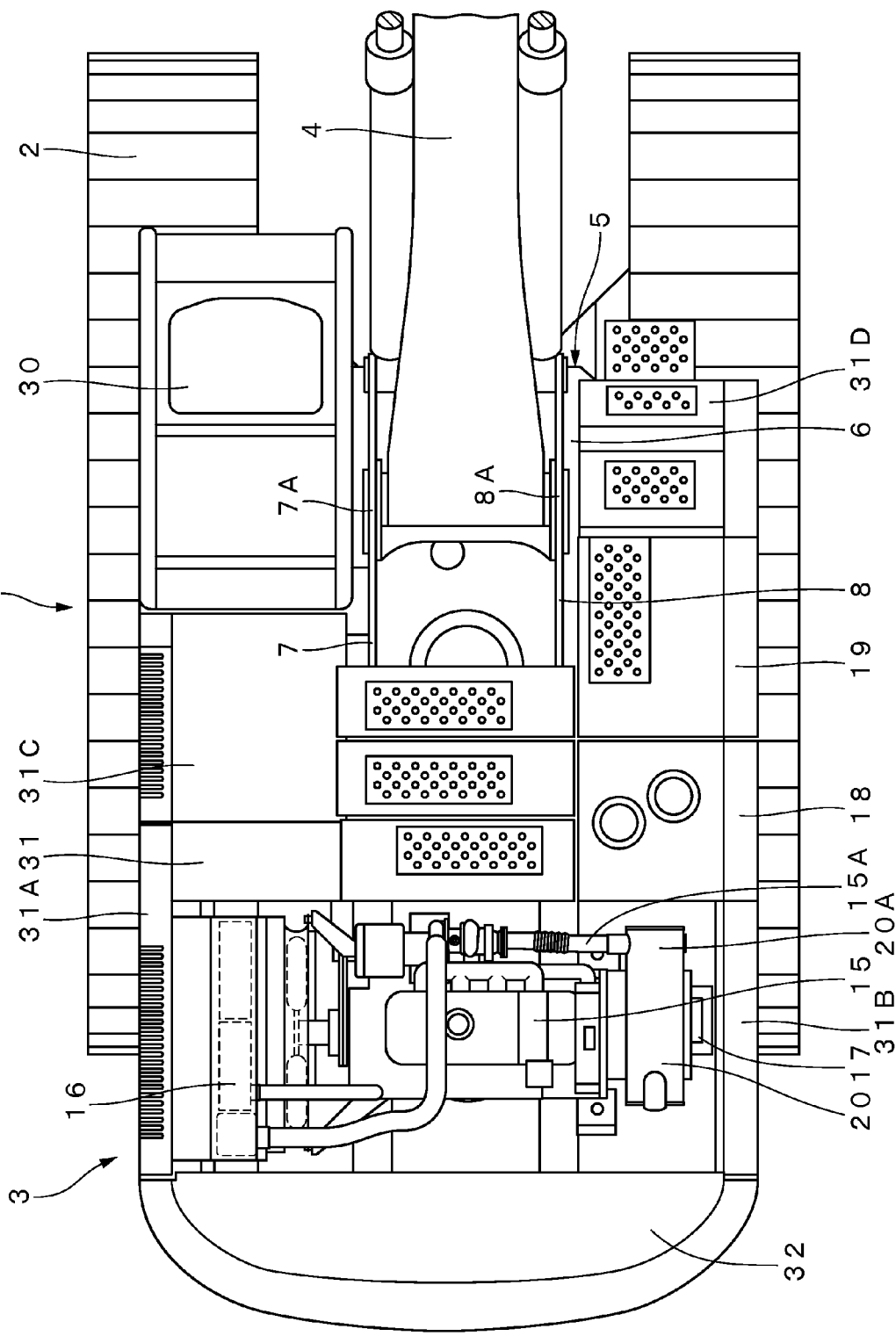
FIG. 2 is a plan view in which the hydraulic excavator is shown in a state where a working mechanism and a housing cover are partially omitted.
Figure 4:
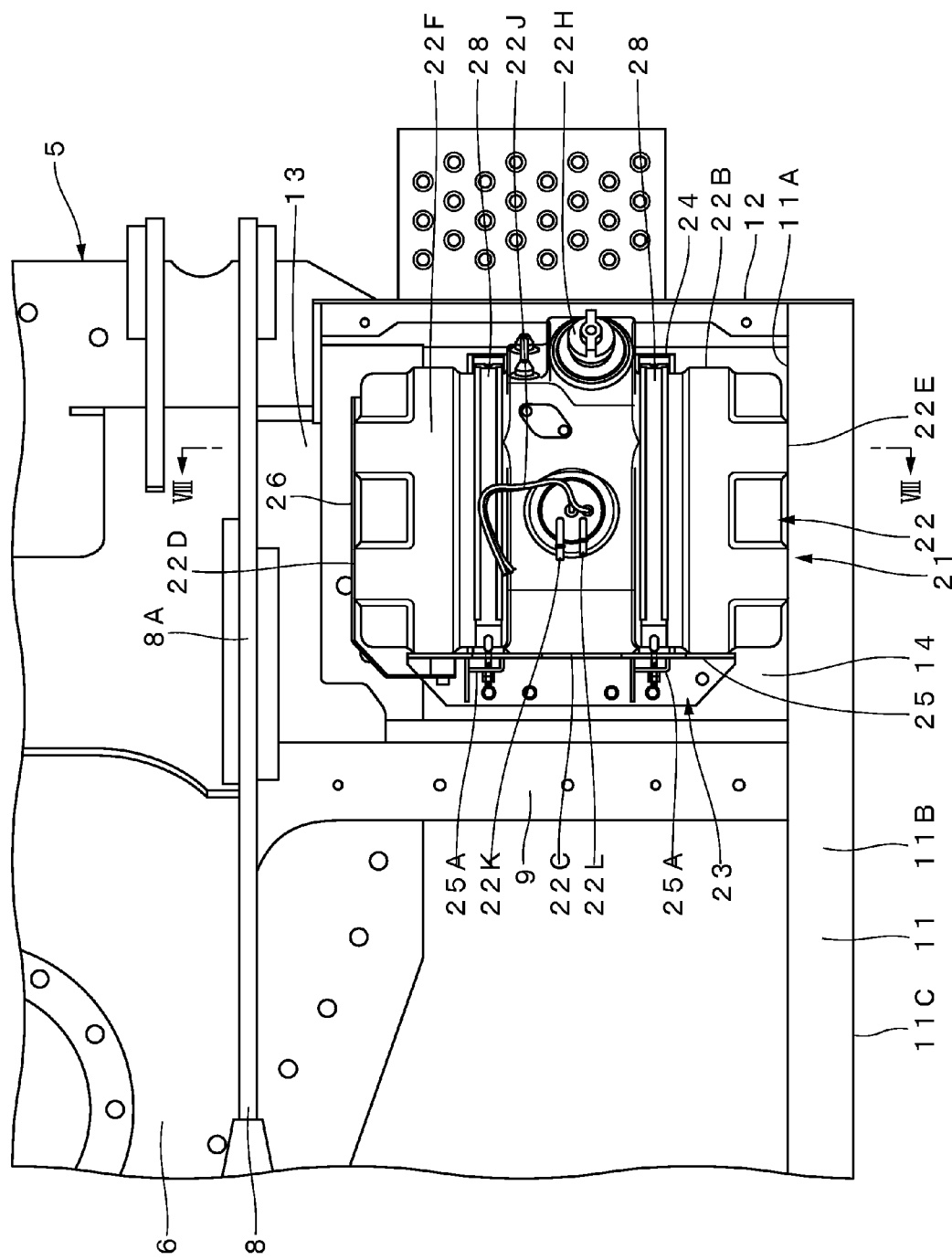
FIG. 4 is an enlarged plan view of an essential part showing a state in which a reduction agent tank subassembly is disposed on a front right part of the revolving frame.
Figure 5:
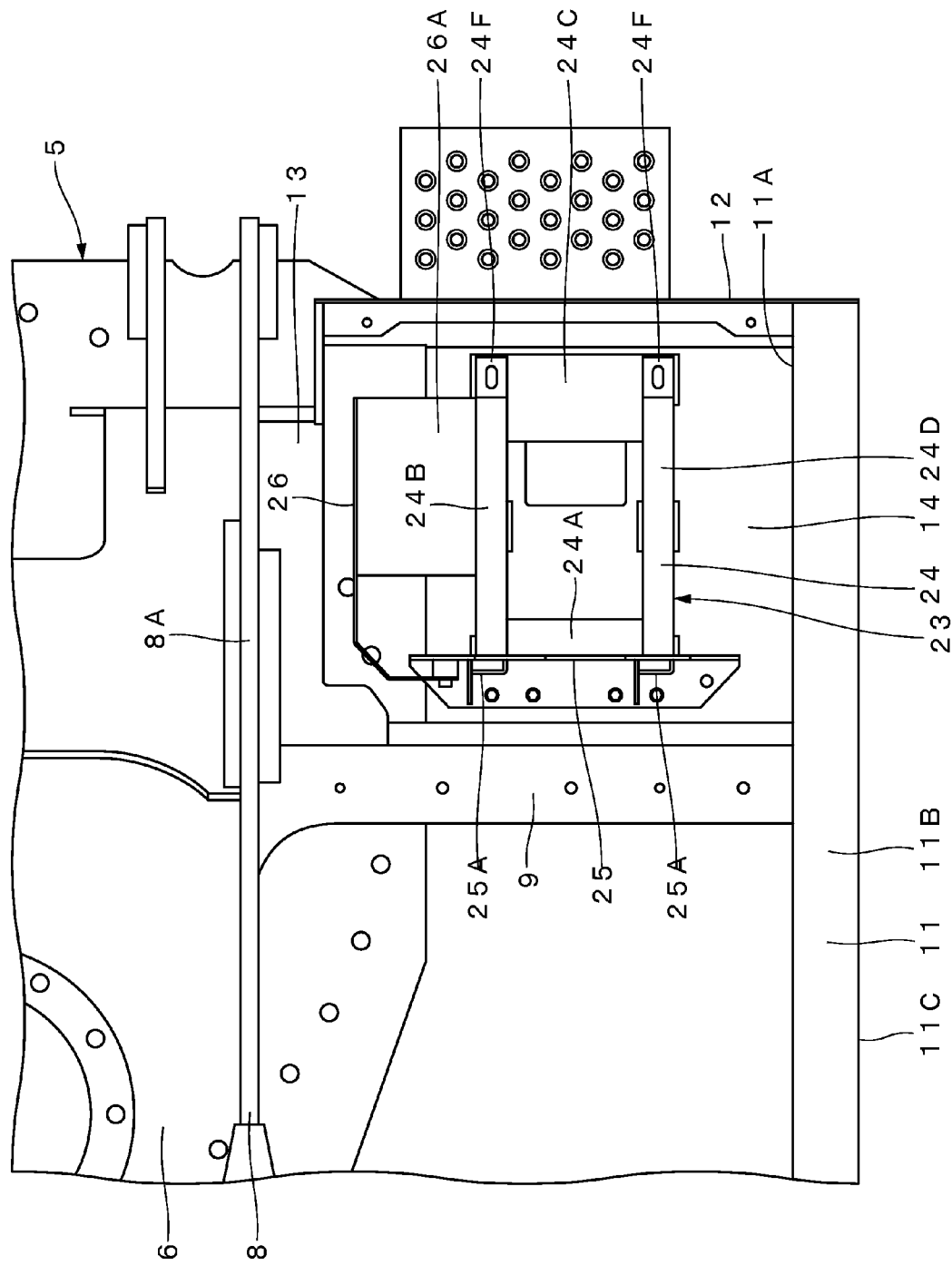
FIG. 5 is an enlarged plan view of an essential part showing a state in which a tank bracket is mounted on the front right part of the revolving frame as viewed from a position similar to FIG. 4.

As shown in FIG. 2 and FIG. 4, the upper revolving structure 3 includes a revolving frame 5 which will be described later, an engine 15, an NOx purifying device 20, and a reduction agent tank subassembly 21.

Figure 3:
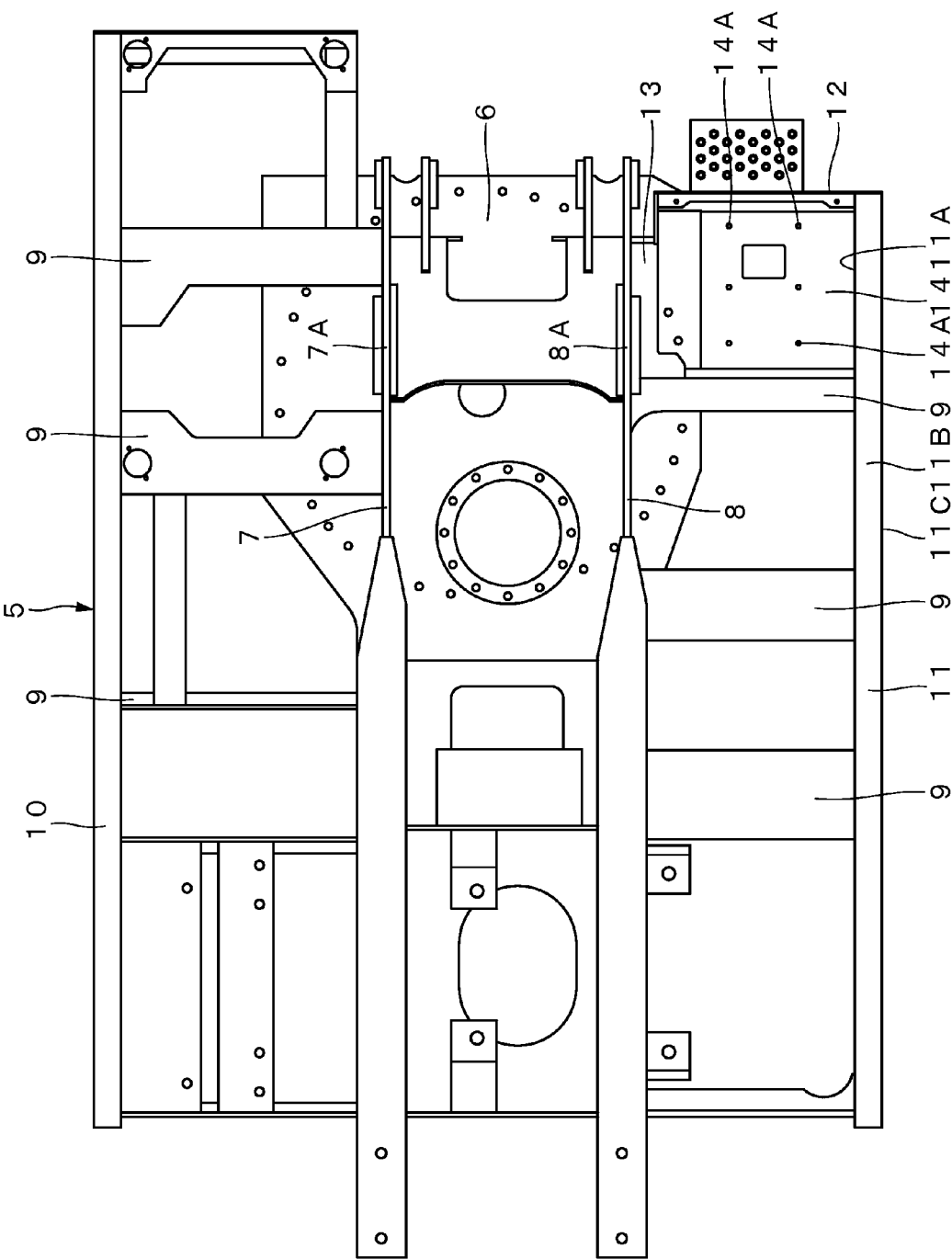
FIG. 3 is a plan view showing a revolving frame as a single unit.

The revolving frame 5 constitutes a vehicle body frame forming a base of the upper revolving structure 3. As shown in FIG. 3, the revolving frame 5 is configured by a bottom plate 6, a left vertical plate 7 and a right vertical plate 8 installed upright on the bottom plate 6 and extending in the front-rear direction at a predetermined interval in a left-right direction, a plurality of extension beams 9 extending outward in the left-right direction from the bottom plate 6, each of the vertical plates 7 and 8 and arranged at an interval in the front-rear direction, a left side frame 10 and a right side frame 11 located on an outside in the left-right direction, mounted on a tip end of each of the extension beams 9, and extending in the front-rear direction, a front side beam 12 extending from a front right corner part of the bottom plate 6 toward a front end of the right side frame 11 in the left-right direction, an inner side frame 13 extending in the front-rear direction along the right vertical plate 8 so as to connect a left end of the extension beam 9 located on the front right side and a left end of the front side beam 12, and an undercover 14 provided on the front right side.

The bottom plate 6 of the revolving frame 5 is formed as a thick plate body extending in the front-rear direction and is mounted rotatably on the lower traveling structure 2. Moreover, the left and right vertical plates 7 and 8 have their front side positions forming mounting parts 7A and 8A for mounting the working mechanism 4.

Figure 8:
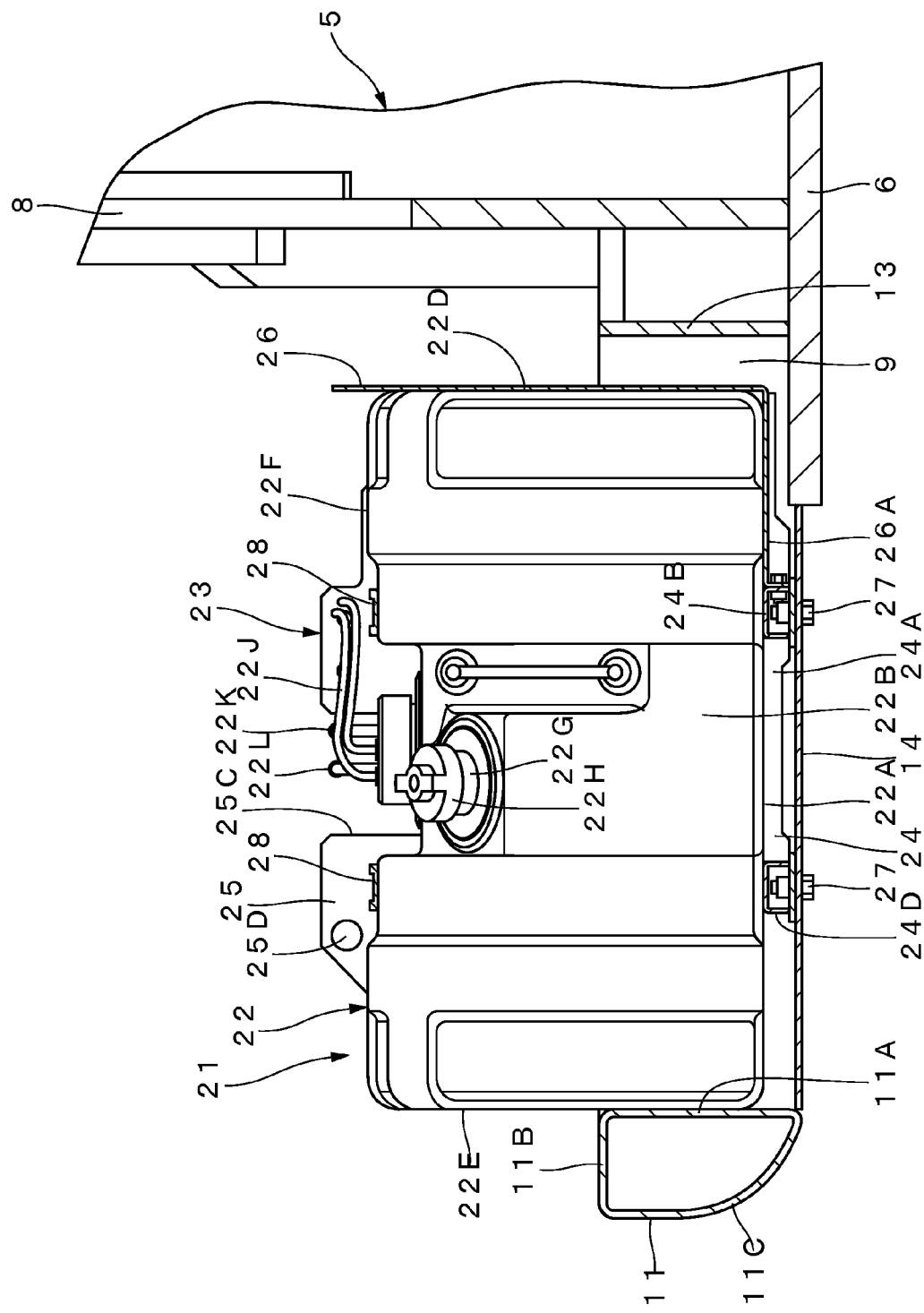
FIG. 8 is a sectional view showing a reduction agent tank in an outer shape and the revolving frame and the reduction agent tank subassembly as viewed in the direction of arrows VIII-VIII in FIG. 4.

As shown in FIG. 8, the right side frame 11 is formed as a cylindrical body having a substantially D-shaped section. Specifically, the right side frame 11 is configured by an inner side surface part 11A as a rising surface part located on an inner side in the left-right direction which is the right vertical plate 8 side and rising in the vertical direction, an upper side surface part 11B bending from an upper part of the inner side surface part 11A and extending outward, and an outer side surface part 11C bending from an outer side end portion of the upper side surface part 11B and extending downward and having a lower part side curved inward and connected to a lower part of the inner side surface part 11A. In the first embodiment, the inner side surface part 11A forming a part of the right side frame 11 is used as the rising surface part so as to realize the constitution of fixing the reduction agent tank 22 which will be described later. Further, the left side frame 10 is also formed as a cylindrical body having a substantially D-shaped section similarly to the right side frame 11.

Moreover, the undercover 14 is arranged within a range on the front right side surrounded by the bottom plate 6 (inner side frame 13), the extension beam 9 on the front right, the right side frame 11, and the front side beam 12. Other than this undercover 14, undercovers (not shown) are arranged at plural spots between the bottom plate 6 and the left and right side frames 10 and 11.

Figure 7:
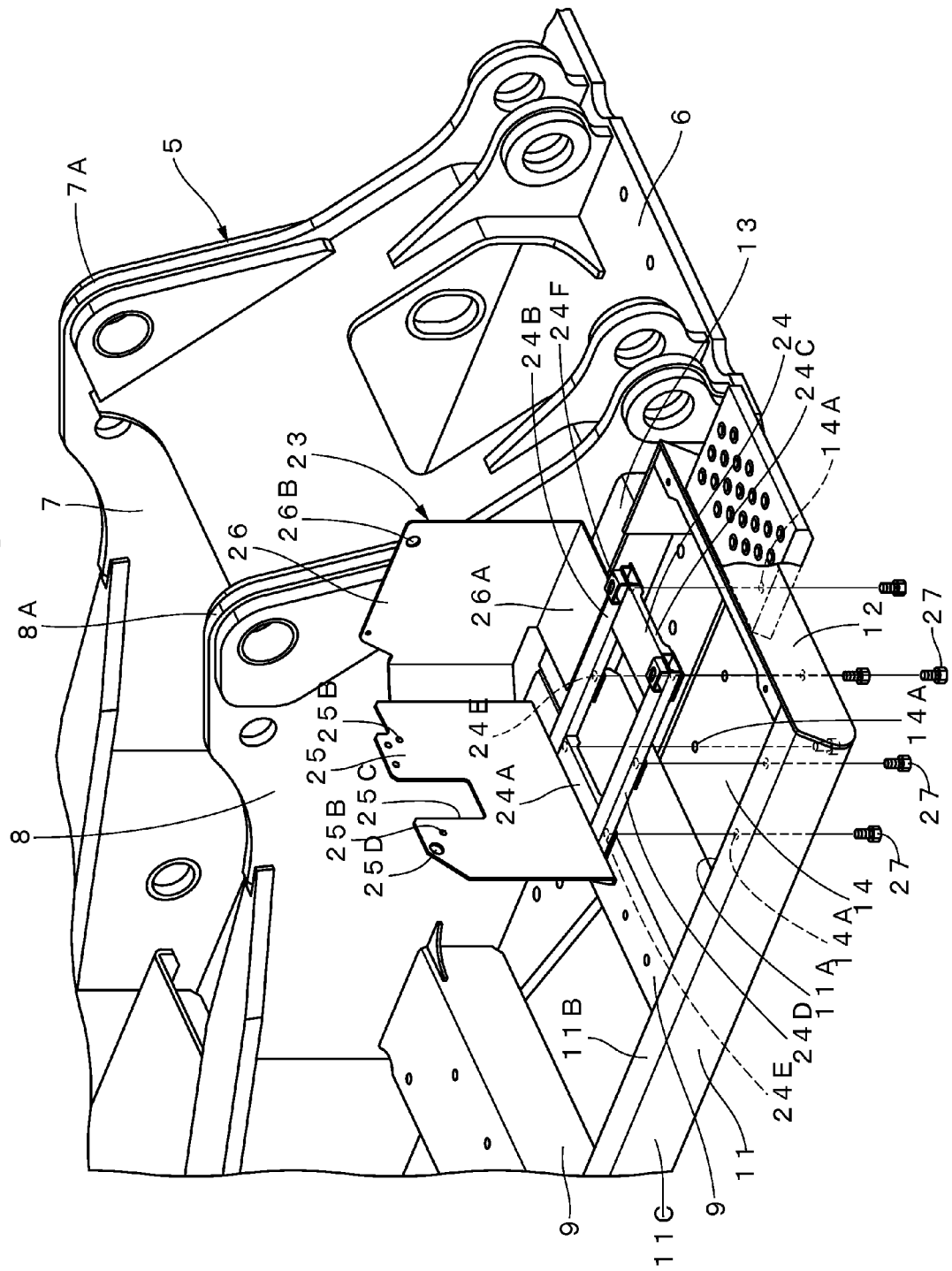
FIG. 7 is an exploded perspective view of a mounting structure of the tank bracket with respect to the revolving frame as viewed from a position similar to FIG. 6.

Here, as shown in FIG. 4 and FIG. 8, the undercover 14 is on which the reduction agent tank subassembly 21 which will be described later is mounted. As shown in FIG. 3 and FIG. 7, a plurality of or six bolt through holes 14A, for example, corresponding to female screw holes 24E of a tank bracket 23 constituting the reduction agent tank subassembly 21 are provided in the undercover 14.

As shown in FIG. 2, the engine 15 is provided on a rear side of the revolving frame 5 and the engine 15 is configured as a diesel engine and is mounted on the revolving frame 5 on a laterally placed state, for example. In this engine 15, an exhaust pipe 15A for exhausting an exhaust gas is provided.

The diesel engine 15 has high efficiency and excellent durability, but harmful substances such as nitrogen oxides (NOx) and the like are exhausted with the exhaust gas. Thus, the NOx purifying device 20 mounted on the exhaust pipe 15A and which will be described later accommodates a urea selective reduction catalyst for removing the nitrogen oxides (NOx) and an oxidation catalyst (none of them is shown) in an accommodating tubular body 20A.

A heat exchanger 16 is provided on a left side of the engine 15 and the heat exchanger 16 is configured by a radiator for cooling an engine cooling water, an oil cooler for cooling a hydraulic oil, an intercooler for cooling air sucked by the engine 15 and the like. On the other hand, a hydraulic pump 17 is mounted on a right side of the engine 15. This hydraulic pump 17 is to discharge the hydraulic oil from a hydraulic oil tank 18 as a pressurized oil by being driven by the engine 15.

The hydraulic oil tank 18 is located on a front side of the engine 15 and is provided on a right side of the revolving frame 5. This hydraulic oil tank 18 is to store the hydraulic oil therein and is formed as a pressure-resistant tank having a cuboid shape extending in the vertical direction.

A fuel tank 19 is provided on the right side of the revolving frame 5 so as to abut against the front side of the hydraulic oil tank 18. This fuel tank 19 is to store fuel therein and is formed as a cuboid tank extending in the vertical direction and is mounted on the extension beam 9.

The NOx purifying device 20 constitutes an exhaust gas post-treatment device for treating an exhaust gas exhausted from the engine 15 through the exhaust pipe 15A. This NOx purifying device 20 is to purify the nitrogen oxides (NOx) in the exhaust gas by using urea water (urea water solution) which is a reduction agent. The NOx purifying device 20 includes the accommodating tubular body 20A connected to the exhaust pipe 15A, the urea selective reduction catalyst accommodated in the accommodating tubular body 20A, the oxidation catalyst, a urea water injection valve (none of them is shown). The urea water injection valve is connected to the reduction agent tank 22 which will be described later through a hose, a urea water pump and the like (none of them is shown).

Here, the NOx purifying device 20 injects the urea water into the exhaust gas by the urea water injection valve, causes the NOx in the exhaust gas to perform reduction reaction by using ammonia generated from the urea water by the urea selective reduction catalyst, and decomposes it to water and nitrogen. Then, by reducing ammonia in the exhaust gas by the oxidation catalyst, the NOx in the exhaust gas is purified.

Next, the mounting structure of the reduction agent tank 22 with respect to the revolving frame 5 which is a feature part of the present invention will be described. In the first embodiment, it is constituted such that the reduction agent tank 22 is fixed in a positioned state by using the right side frame 11 of the revolving frame 5.

As shown in FIG. 8 to FIG. 11, the reduction agent tank subassembly 21 includes the reduction agent tank 22 which will be described later, the tank bracket 23, and a fixing band 28. This reduction agent tank subassembly 21 is assembled by fixing the reduction agent tank 22 by using the fixing band 28 to the tank bracket 23 in a state in which the reduction agent tank 22 is placed on the tank bracket 23. Then, by using the female screw holes 24E of the bottom surface part 24 constituting the bracket fixing portion, the reduction agent tank subassembly 21 is fixed to the undercover 14 of the revolving frame 5 by screwing the bolts 27 to the female screw holes 24E.

The reduction agent tank 22 is to store urea water as a reduction agent to be supplied to the NOx purifying device 20. This reduction agent tank 22 is accommodated in an accommodating case 31D of a housing cover 31 located on the front right part of the revolving frame 5, for example, and which will be described later.

The reduction agent tank 22 is formed as a substantially cuboid container having an inside forming a closed space. That is, the reduction agent tank 22 is formed by a rectangular bottom surface 22A, a front surface 22B extending upward from one end edge of the bottom surface 22A in a short direction, a rear surface 22C extending upward from the other end edge of the bottom surface 22A in the short direction, a pair of side surfaces 22D and 22E arranged facing each other on both sides in a lengthy direction of the bottom surface 22A so as to sandwich the bottom surface 22A, the front surface 22B, and the rear surface 22C, and an upper surface 22F provided by closing upper parts of the front surface 22B, the rear surface 22C, and each of the side surfaces 22D and 22E, for example. The upper surface 22F is formed with a center part in the lengthy direction flat and both side parts protruding in an arc state, for example.

At a corner part between the front surface 22B and the upper surface 22F, a water supply port 22G for supplying urea water is provided, and a detachable cap 22H is mounted on the water supply port 22G. Moreover, at the center part of the upper surface 22F, a lead wire 22J, a urea water supply port 22K, a return port 22L and the like connected to sensors such as a temperature sensor, a liquid level sensor (remaining quantity meter) and the like (not shown) are disposed. Further, the water supply port of the urea water may be configured to be provided also on the front surface or the upper surface other than the corner part between the front surface and the upper surface.

Here, the reduction agent tank 22 according to the first embodiment is fixed by being sandwiched between the right side frame 11 of the revolving frame 5 and a second side surface part 26 of the tank bracket 23. As described above, since the reduction agent tank 22 can be fixed, the configuration of the tank bracket 23 can be simplified. Moreover, as the result of simplification of the configuration of the tank bracket 23, an installation space of the reduction agent tank 22 can be ensured, and thus, a length dimension between each of the side surfaces 22D and 22E can be set longer. As a result, the reduction agent tank 22 has a capacity large enough to store urea water in a quantity required for operation for a long time.

Figure 12:
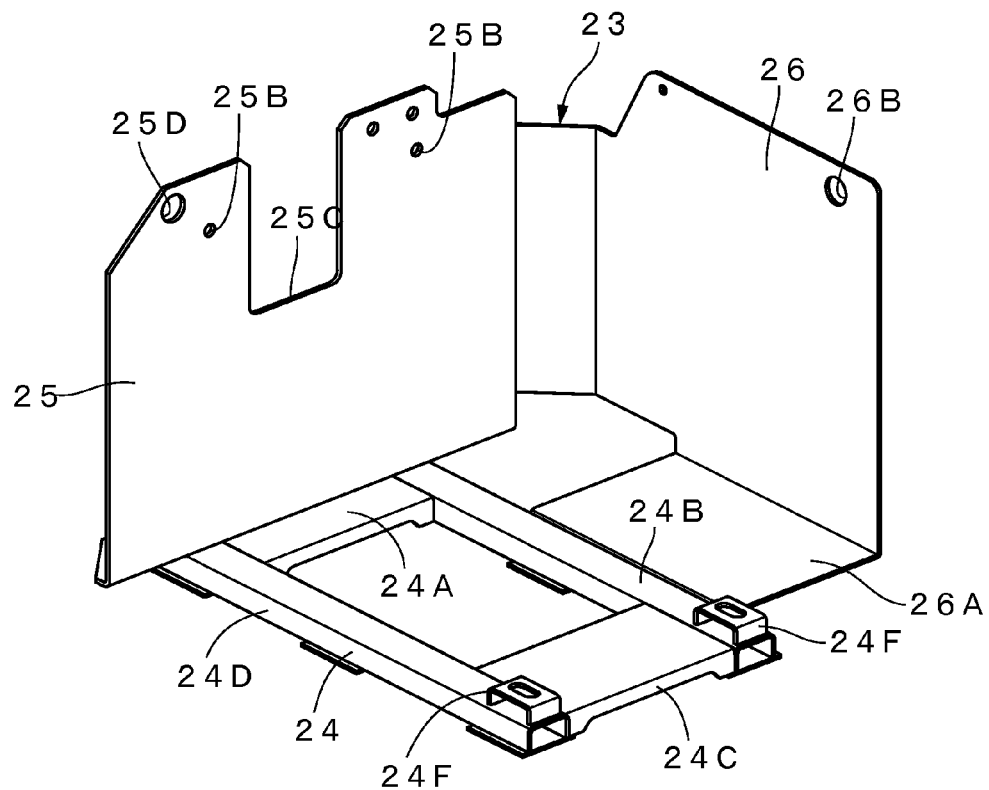
FIG. 12 is a perspective view of the tank bracket in FIG. 7 as a single unit as viewed from an upper side of the front right.
Figure 13:
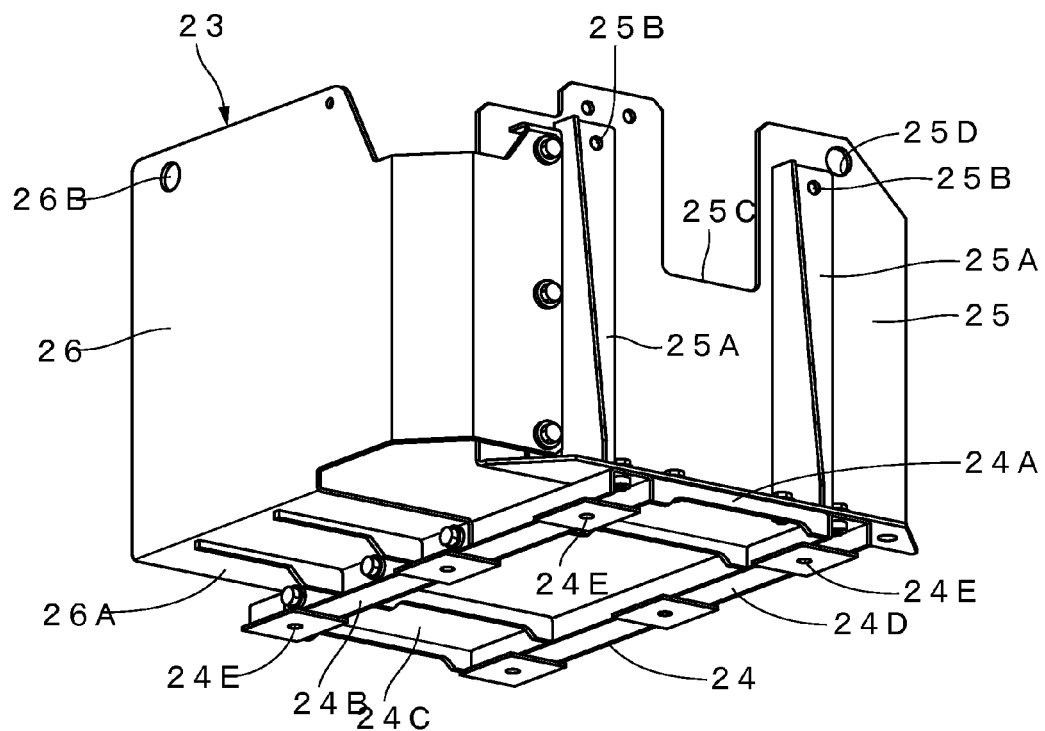
FIG. 13 is a perspective view of the tank bracket as the single unit as viewed from a lower side of the rear left.

The tank bracket 23 is to hold the reduction agent tank 22 on the undercover 14 of the revolving frame 5. Here, the tank bracket 23 according to the first embodiment has the reduction agent tank 22 arranged in a state in which the water supply port 22G of the reduction agent tank 22 is located on the front, that is, the front surface 22B is located on the front side, the rear surface 22C is on the rear side, the one side surface 22D is on the left side, and the other side surface 22E is on the right side. In this case, the reduction agent tank 22 is fixed by being sandwiched between the right side frame 11 of the revolving frame 5 and the tank bracket 23. As shown in FIG. 12 and FIG. 13, the tank bracket 23 is configured by the bottom surface part 24 which will be described later, the first side surface part 25, and the second side surface part 26.

The bottom surface part 24 is on which the reduction agent tank 22 is placed and is formed having a square shape (rectangular shape) having a first frame body 24A, a second frame body 24B, a third frame body 24C, and a fourth frame body 24D. In this first embodiment, the first frame body 24A of the bottom surface part 24 is arranged on the rear side, the second frame body 24B is arranged on the left side adjacent to the first frame body 24A, the third frame body 24C is arranged on the front side, and the fourth frame body 24D is arranged on the right side.

Here, the first frame body 24A and the third frame body 24C are formed short, while the second frame body 24B and the fourth frame body 24D are formed long. Moreover, in the first embodiment, the bottom surface part 24 is described as a corner frame body in which a position of the front side of the fuel tank 19 (extension beam 9 on the front right part) is set to the first frame body 24A, and the second frame body 24B, the third frame body 24C, and the fourth frame body 24D are arranged clockwise. Therefore, the second frame body 24B is arranged at a position faced with the right vertical plate 8 of the revolving frame 5, the third frame body 24C is arranged at a position faced with the front side beam 12, and the fourth frame body 24D is arranged at a position faced with the right side frame 11.

As shown in FIG. 12 and FIG. 13, in the bottom surface part 24, the female screw holes 24E as the bracket fixing portions are provided at positions on the lower surface sides of the second frame body 24B and the fourth frame body 24D. The female screw holes 24E configuring the bracket fixing portion are arranged in six in total, that is, three each on the lower surface side of the second frame body 24B and the lower surface side of the fourth frame body 24D at an interval in the front-rear direction, respectively. Moreover, in the bottom surface part 24, band hook portions 24F are provided at front side position of the second frame body 24B located on the left side and the fourth frame body 24D located on the right side, respectively.

The bottom surface part 24 is formed as a strength member by combining the aforementioned four frame bodies 24A to 24D. Further, the bottom surface part 24 is formed having a corner frame shape by the four frame bodies 24A to 24D, but it is only necessary that the bottom surface part is formed by considering a mounting place, required strength and the like, and it may have any other shapes such as a flat plate body, a corrugated plate body, a drainboard and the like, for example.

The first side surface part 25 is provided in the vertical direction by being supported by the first frame body 24A of the bottom surface part 24. With the first side surface part 25, the rear surface 22C of the reduction agent tank 22 is brought into contact, and on its back surface side, as shown in FIG. 13, two reinforcing members 25A extending in the vertical direction are provided at an interval in the left-right direction.

Moreover, on the upper side of the first side surface part 25, a plurality of male screw through holes 25B are provided by penetrating the upper part of each of the reinforcing members 25A in the front-rear direction. Moreover, a notched portion 25C is formed between each of the reinforcing members 25A. This notched portion 25C is a passage through which the lead wire 22J of the reduction agent tank 22, a hose (not shown) through which the urea water flows and the like are passed. Moreover, a lifting hole 25D is provided on the upper right side of the first side surface part 25, and in the lifting hole 25D, a lifting tool such as a wire (not shown) can be hooked when the reduction agent tank subassembly 21 is lifted and moved.

The second side surface part 26 is provided in the vertical direction by being supported by the second frame body 24B adjacent to the first frame body 24A of the bottom surface part 24. With the second side surface part 26, the one side surface 22D of the reduction agent tank 22 is brought into contact, and a flat plate body 26A extending in the horizontal direction toward the bottom surface part 24 is mounted on the second frame body 24B of the bottom surface part 24. A rear side (the first side surface part 25 side) of the second side surface part 26 is bent to the right side and bolted to the first side surface part 25. As a result, the first side surface part 25 and the second side surface part 26 form an L-shaped wall surface in collaboration. Moreover, a lifting hole 26B is provided on the upper front side of the second side surface part 26, and in the lifting hole 26B, a lifting tool such as a wire and the like can be hooked when the reduction agent tank subassembly 21 is lifted and moved similarly to the lifting hole 25D of the first side surface part 25.

As shown in FIG. 8, the tank bracket 23 is arranged in a state in which the reduction agent tank 22 is sandwiched between the second side surface part 26 and the inner side surface part 11A of the right side frame 11 forming the revolving frame 5. Further, as shown in FIG. 7, the tank bracket 23 is fixed on the undercover 14. That is, the bolt 27 is inserted through each of the bolt through holes 14A of the undercover 14, and this bolt 27 is screwed with each of the female screw holes 24E of the bottom surface part 24 as the bracket fixing portion. As a result, the tank bracket 23 is fixed on the undercover 14 (see FIG. 5).

Figure 6:
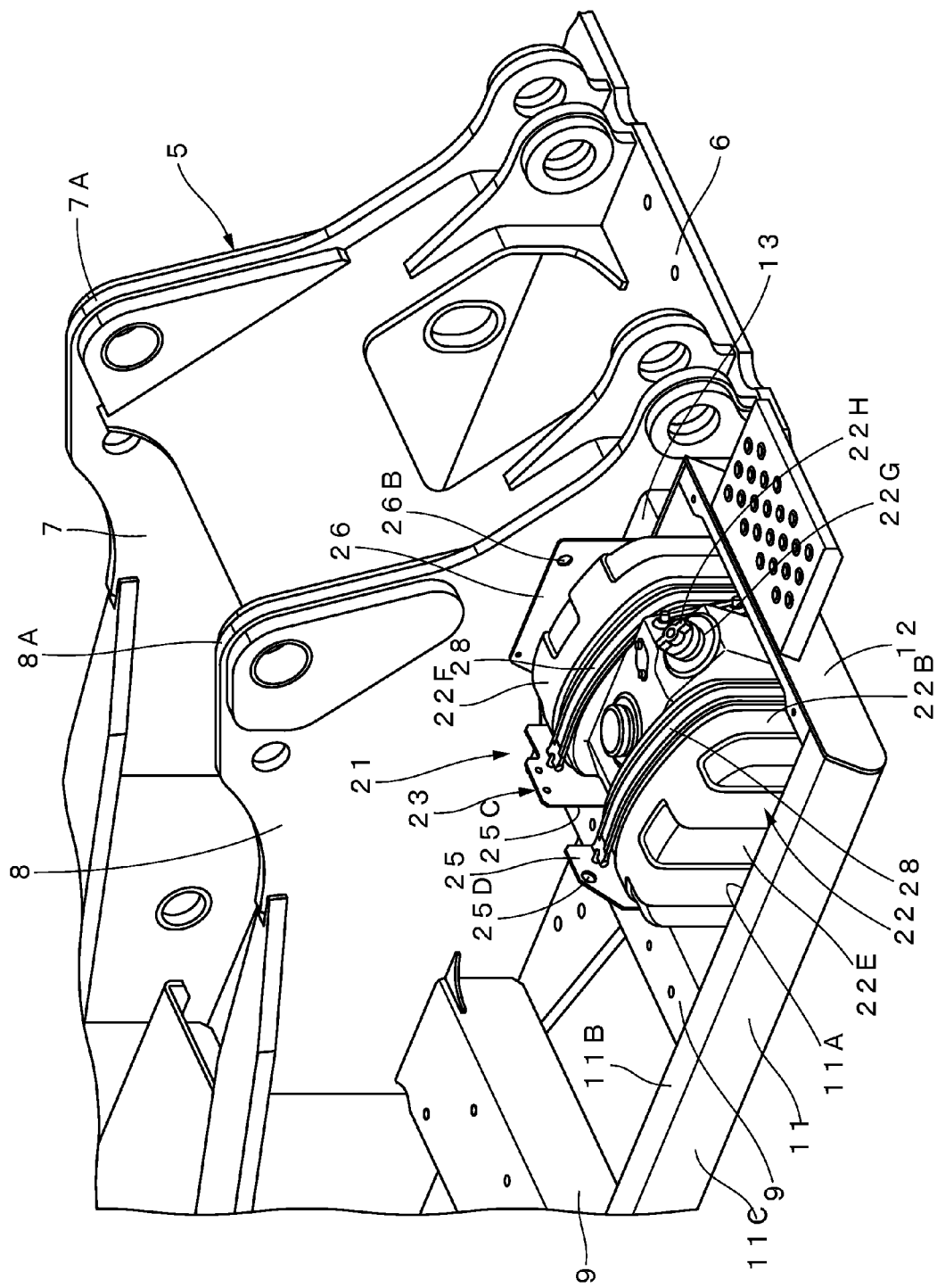
FIG. 6 is an enlarged perspective view of an essential part showing a state in which the reduction agent tank subassembly is disposed on the front right part of the revolving frame.

As shown in FIG. 4 and FIG. 6, the two fixing bands 28 are provided on the tank bracket 23 and to fix the reduction agent tank 22 to the tank bracket 23. The fixing bands 28 are arranged on the reduction agent tank 22 at an interval in the left-right direction. In this case, each of the fixing bands 28 is located and extended between the third frame body 24C facing the first frame body 24A of the bottom surface part 24 and the upper part of the first side surface part 25.

Figure 9:
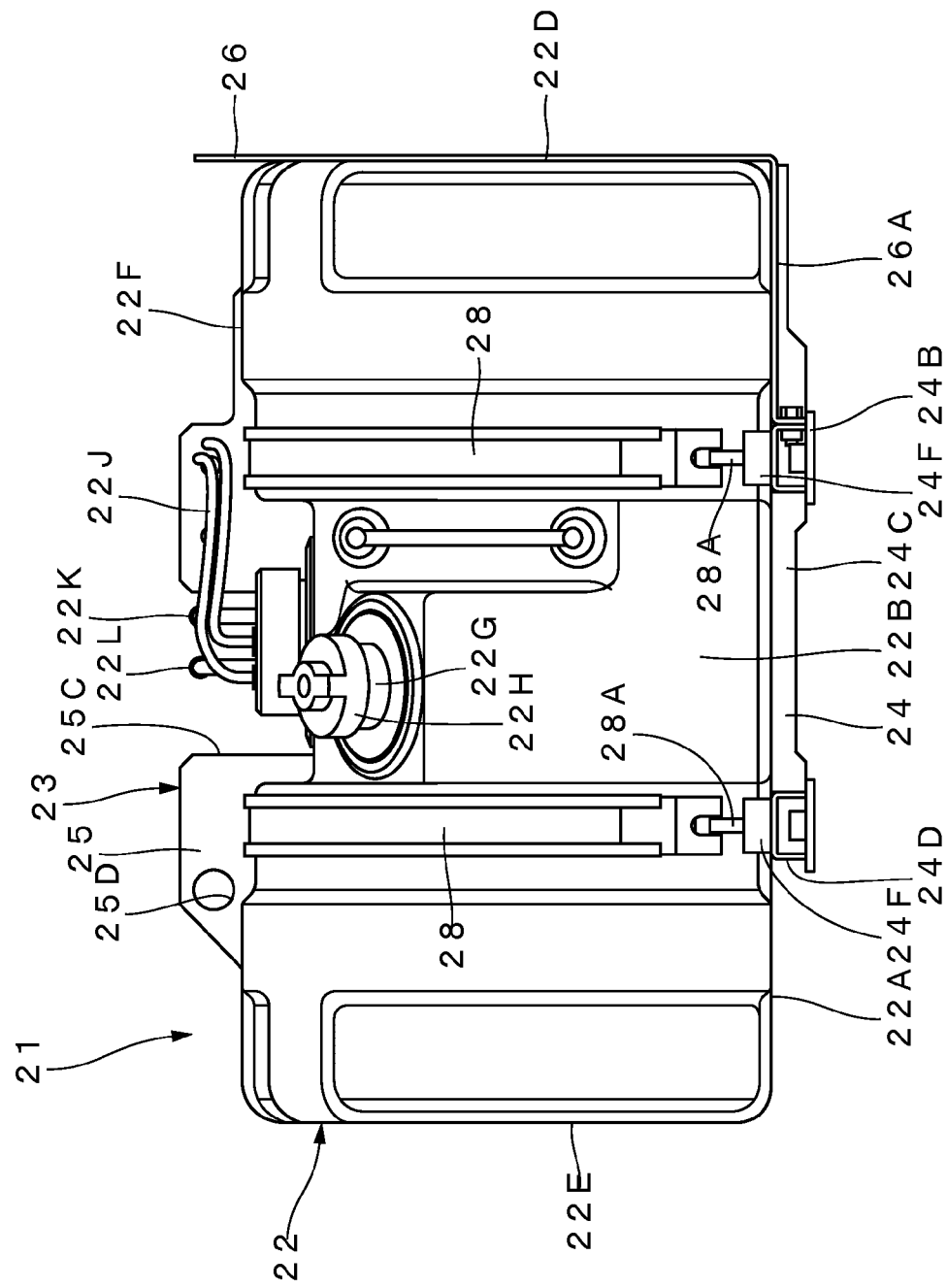
FIG. 9 is a frontal view showing the reduction agent tank subassembly.
Figure 10:
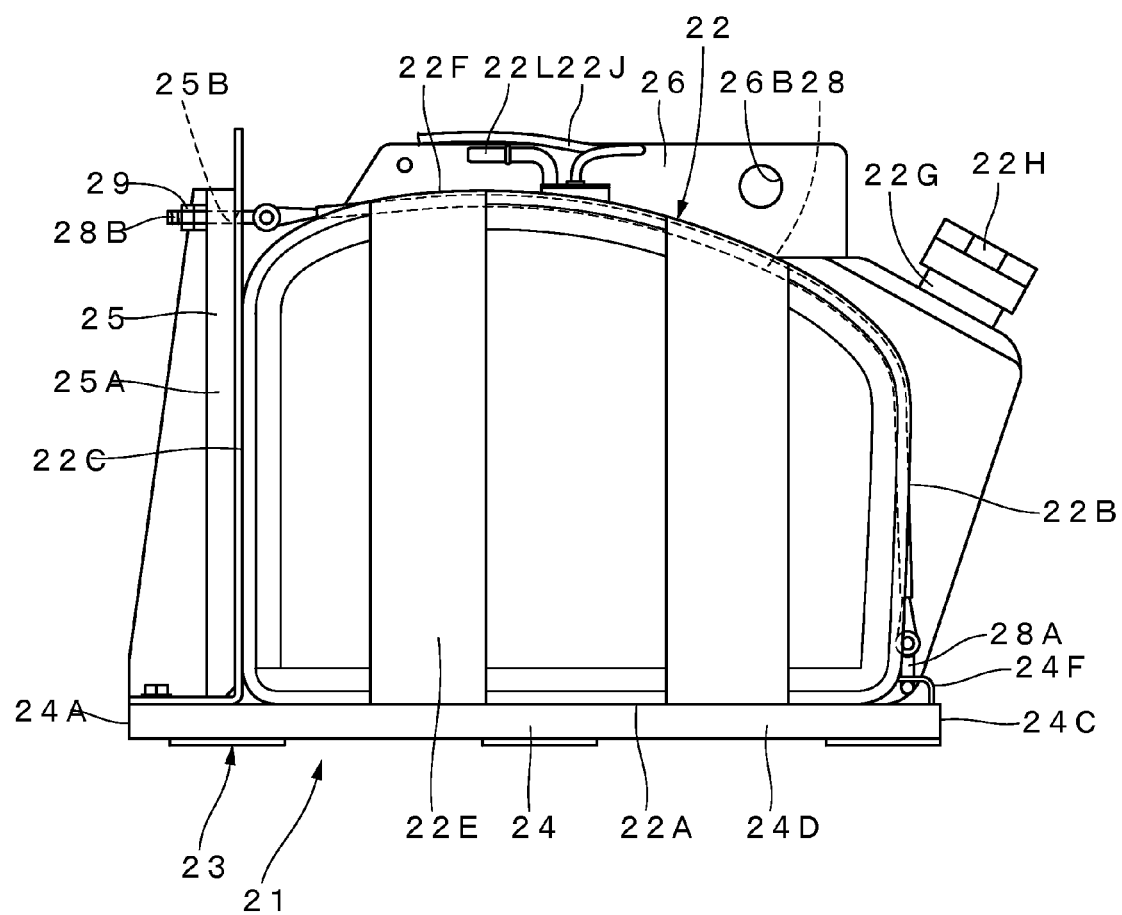
FIG. 10 is a right side view showing the reduction agent tank subassembly.
Figure 11:
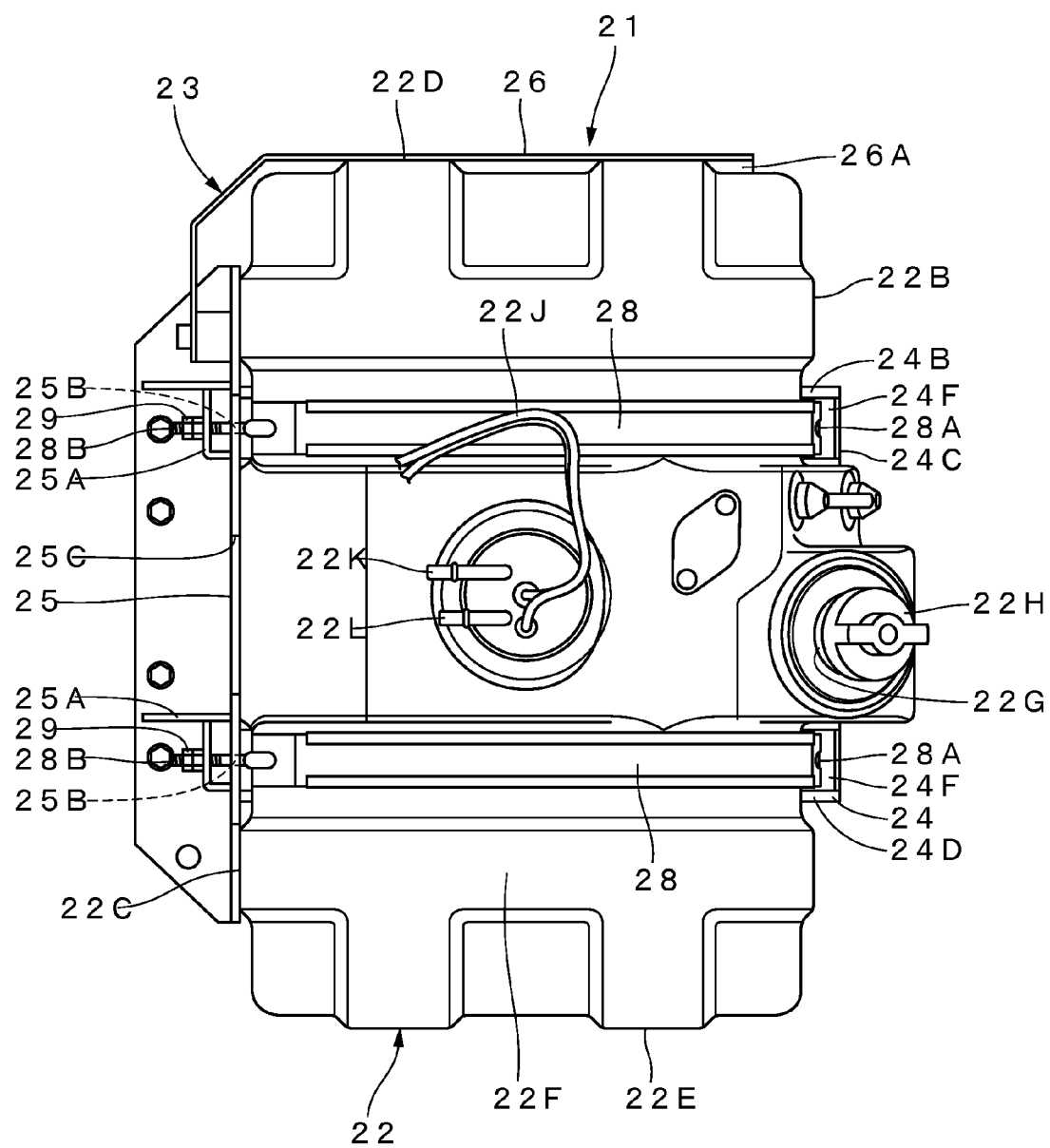
FIG. 11 is a plan view showing the reduction agent tank subassembly.

As shown in FIG. 9 and FIG. 10, each of the fixing bands 28 has a T-shaped hook 28A provided on a lower end portion, and this hook 28A is engaged with a band hook portion 24F. On the other hand, as shown in FIG. 10 and FIG. 11, each of the fixing bands 28 has a male screw portion 28B provided on the upper end portion, and this male screw portion 28B is inserted into the male screw through hole 25B of the first side surface part 25. In this state, a nut 29 is screwed with the male screw portion 28B, and the nut 29 is tightened so as to pull the fixing band 28. As a result, each of the fixing bands 28 can press and fix the reduction agent tank 22 mounted on the tank bracket 23 to the bottom surface part 24 and the first side surface part 25.

Further, a cab 30 is provided on a front left side of the revolving frame 5. This cab 30 is for an operator to get onboard in order to operate the hydraulic excavator 1, and a driver's seat on which the operator is seated, levers, pedals and the like for performing various operations (none of them is shown) are disposed therein.

As shown in FIG. 1 and FIG. 2, the housing cover 31 covers equipment including the engine 15, the heat exchanger 16, and the NOx purifying device 20 from side and above. This housing cover 31 is located between the cab 30 mounted on the front side of the revolving frame 5 and a counterweight 32 mounted on the rear side of the revolving frame 5 and provided on the revolving frame 5. The housing cover 31 includes a left surface cover part 31A covering a left side of the heat exchanger 16, a right surface cover part 31B covering a right side of the hydraulic pump 17 and the like, and an upper surface cover part 31C located on upper sides of each of the cover parts 31A and 31B and covering upper sides of the engine 15, the NOx purifying device 20 and the like.

Moreover, the housing cover 31 has an accommodating case 31D located on a front right part of the revolving frame 5, that is, on the front side of the fuel tank 19. In this accommodating case 31D, the reduction agent tank subassembly 21 including the reduction agent tank 22 is accommodated.

The hydraulic excavator 1 according to the first embodiment has the configuration as described above, and its operation will be described below.

The operator onboard the cab 30 starts the engine 15 and drives the hydraulic pump 17. By operating the lever for running and the like in this state, the lower traveling structure 2 can be moved forward or backward. Moreover, by operating the lever for working, the working mechanism 4 can be moved downward/upward so as to perform an excavating work of earth and sand and the like.

During the operation of the engine 15, the exhaust gas containing nitrogen oxides (NOx) which are harmful substances is exhausted from the exhaust pipe 15A. At this time, the urea water in the reduction agent tank 22 is supplied to the urea water injection valve of the NOx purifying device 20 by using the urea water pump. At this time, the NOx purifying device 20 injects the urea water into the exhaust gas from the urea water injection valve and generates ammonia. As a result, the urea selective reduction catalyst can reduce the nitrogen oxides into water and nitrogen to be exhausted to an outside through the oxidation catalyst, an emission of the nitrogen oxides can be reduced.

Next, an assembling procedure of the reduction agent tank subassembly 21 and a work procedure when the reduction agent tank subassembly 21 is fixed to the revolving frame 5 will be described.

First, the assembling procedure of the reduction agent tank subassembly 21 will be described. The reduction agent tank 22 is placed on the bottom surface part 24 of the tank bracket 23. At this time, the reduction agent tank 22 is arranged so that the one side surface 22D located on the left side is brought close to the second side surface part 26. Next, the T-shaped hook 28A of each of the fixing bands 28 is engaged with the band hook portion 24F of the bottom surface part 24, and the male screw portion 28B is inserted through the male screw through hole 25B of the first side surface part 25. By screwing the nut 29 with the male screw portion 28B in this state, each of the fixing bands 28 can fix the reduction agent tank 22 between the bottom surface part 24 and the first side surface part 25.

When the reduction agent tank subassembly 21 is assembled as above, the wire is hooked in the lifting hole 25D provided in the first side surface part 25 of the tank bracket 23 and the lifting hole 26B provided in the second side surface part 26 and the reduction agent tank subassembly 21 is lifted up. A position of each of the lifting holes 25D and 26B is set so that the reduction agent tank subassembly 21 is lifted up with a favorable balance. Then, the lifted-up reduction agent tank subassembly 21 is moved to the front right side of the revolving frame 5 and placed on the undercover 14.

At this time, the reduction agent tank subassembly 21 is placed in a laterally placed state so that the other side surface 22E of the reduction agent tank 22 gets close to the inner side surface part 11A of the right side frame 11 constituting the revolving frame 5. By screwing the bolt 27 inserted through each of the bolt through holes 14A of the undercover 14 with each of the female screw holes 24E of the bottom surface part 24 in this state, the reduction agent tank subassembly 21 can be fixed to the undercover 14.

Here, since each of the fixing bands 28 is to fix the reduction agent tank 22 between the bottom surface part 24 and the first side surface part 25, the reduction agent tank 22 can be reliably fixed in two directions, that is, in the front-rear direction and the vertical direction. On the other hand, there is a concern that the reduction agent tank 22 is shifted in the left-right direction orthogonal to the fixing direction by each of the fixing bands 28.

In this case, by providing left and right side surface plates on the tank bracket and by sandwiching the reduction agent tank by the left and right side surface plates from the left-right direction, for example, the reduction agent tank could be reliably fixed in the left-right direction. However, with such configuration, the shape of the tank bracket becomes complicated and moreover, since the left and right side surface plates extend, the reduction agent tank should be formed small, which interferes with size enlargement of the reduction agent tank.

However, according to the first embodiment, the tank bracket 23 for holding the reduction agent tank 22 on the undercover 14 of the revolving frame 5 is provided, and this tank bracket 23 is formed by the bottom surface part 24 having a square shape having the first frame body 24A, the second frame body 24B, the third frame body 24C, and the fourth frame body 24D, the first side surface part 25 supported by the first frame body 24A of the bottom surface part 24 and provided in the vertical direction, and the second side surface part 26 supported by the second frame body 24B of the bottom surface part 24 adjacent to the first frame body 24A and provided in the vertical direction and forming the L-shaped wall surface in collaboration with the first side surface part 25. Moreover, the tank bracket 23 includes the female screw holes 24E located in the bottom surface part 24 and fixing the tank bracket 23. The reduction agent tank 22 is fixed to the tank bracket 23 by using the fixing band 28. In this case, the fixing band 28 fixes the reduction agent tank 22 between the bottom surface part 24 and the first side surface part 25. As a result, the reduction agent tank 22 and the tank bracket 23 are assembled as the reduction agent tank subassembly 21.

Further, the tank bracket 23 is fixed to the undercover 14 of the revolving frame 5. That is, the tank bracket 23 is fixed to the undercover 14 by using each of the female screw holes 24E of the bottom surface part 24 and the bolt 27 in the state in which the reduction agent tank 22 is sandwiched between the second side surface part 26 and the inner side surface part 11A of the right side frame 11.

Therefore, the reduction agent tank 22 can be fixed by being sandwiched between the second side surface part 26 of the tank bracket 23 and the inner side surface part 11A of the right side frame 11, and shifting of the reduction agent tank 22 in the left-right direction can be prevented.

As a result, in the tank bracket 23, since the reduction agent tank 22 can be fixed in the left-right direction only by providing the second side surface part 26 close to the one side surface 22D of the reduction agent tank 22, the configuration of the tank bracket 23 can be simplified. Moreover, since the configuration of the tank bracket 23 is simplified, the size (capacity) of the reduction agent tank 22 can be increased without enlarging the installation space.

By fixing the reduction agent tank 22 by using each fixing band 28 to the tank bracket 23, the reduction agent tank subassembly 21 can be formed. This reduction agent tank subassembly 21 can be fixed to the revolving frame 5 by using each of the female screw holes 24E of the bottom surface part 24 and the bolts 27. As a result, by assembling the reduction agent tank subassembly 21 in advance in another place, the mounting work of the reduction agent tank 22 to the revolving frame 5 can be performed easily, whereby assembling workability can be improved.

On the revolving frame 5, the inner side surface part 11A of the right side frame 11 configuring the revolving frame 5 as the rising surface part rising in the vertical direction is provided, and the reduction agent tank 22 is fixed by being sandwiched between the second side surface part 26 of the tank bracket 23 and the inner side surface part 11A of the right side frame 11. As a result, the reduction agent tank 22 can be fixed by using the inner side surface part 11A of the existing right side frame 11 provided conventionally.

Describing more specifically, the reduction agent tank 22 is formed as a container having the bottom surface 22A, the pair of side surfaces 22D and 22E arranged facing the both sides of the bottom surface 22A, and the upper surface 22F forming a closed space inside between the bottom surface 22A and the pair of side surfaces 22D and 22E. Moreover, the reduction agent tank 22 has configuration in which the one side surface 22D in the pair of side surfaces 22D and 22E is arranged close to the second side surface part 26 of the tank bracket 23 and the other side surface 22E is arranged close to the right side frame 11 of the revolving frame 5. As a result, the reduction agent tank 22 can be fixed with simple configuration.

Moreover, on the upper side of the first side surface part 25 of the tank bracket 23, the notched portion 25C located between each of the reinforcing members 25A is formed. As a result, by passing the lead wire 22J of the reduction agent tank 22, the hose (not shown) through which the urea water flows and the like through the notched portion 25C, they can be wired simply and with good appearance.

Next, FIG. 14 to FIG. 17 show a second embodiment of the present invention. A feature of this embodiment is configuration of fixing the reduction agent tank by using the extension beam forming the revolving frame. It should be noted that in the second embodiment, the component elements that are identical to those of the foregoing first embodiment will be simply denoted by the same reference numerals to avoid repetitions of similar explanations.

Figure 14:
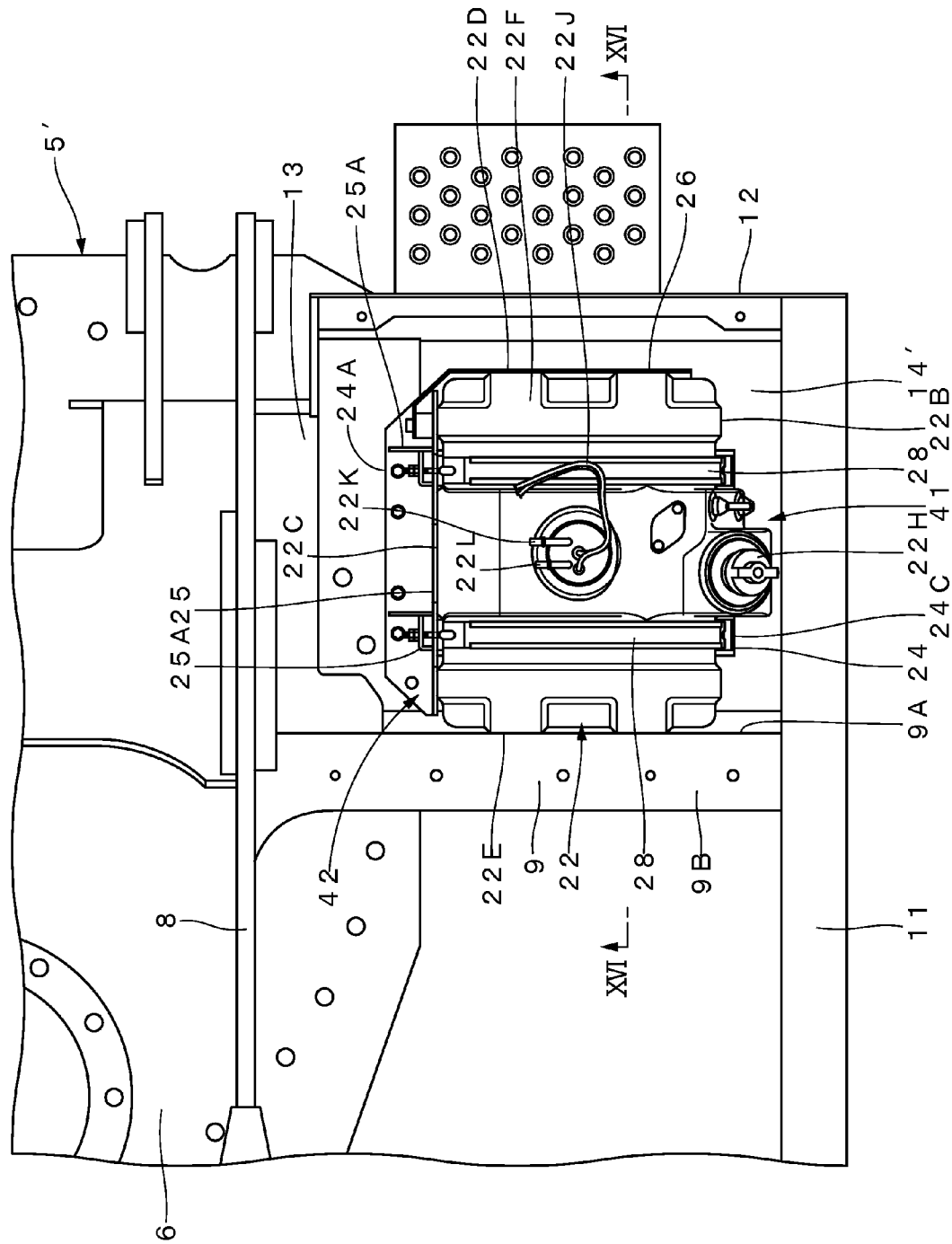
FIG. 14 is an enlarged plan view of an essential part showing a state in which the reduction agent tank subassembly is disposed on the front right part of the revolving frame according to a second embodiment.

In FIG. 14, a revolving frame 5' as the vehicle body frame according to the second embodiment is configured by the bottom plate 6, the left vertical plate 7, the right vertical plate 8, the extension beam 9, the left side frame 10, the right side frame 11, the front side beam 12, the inner side frame 13, and an undercover 14' substantially similarly to the revolving frame 5 according to the first embodiment.

Figure 15:
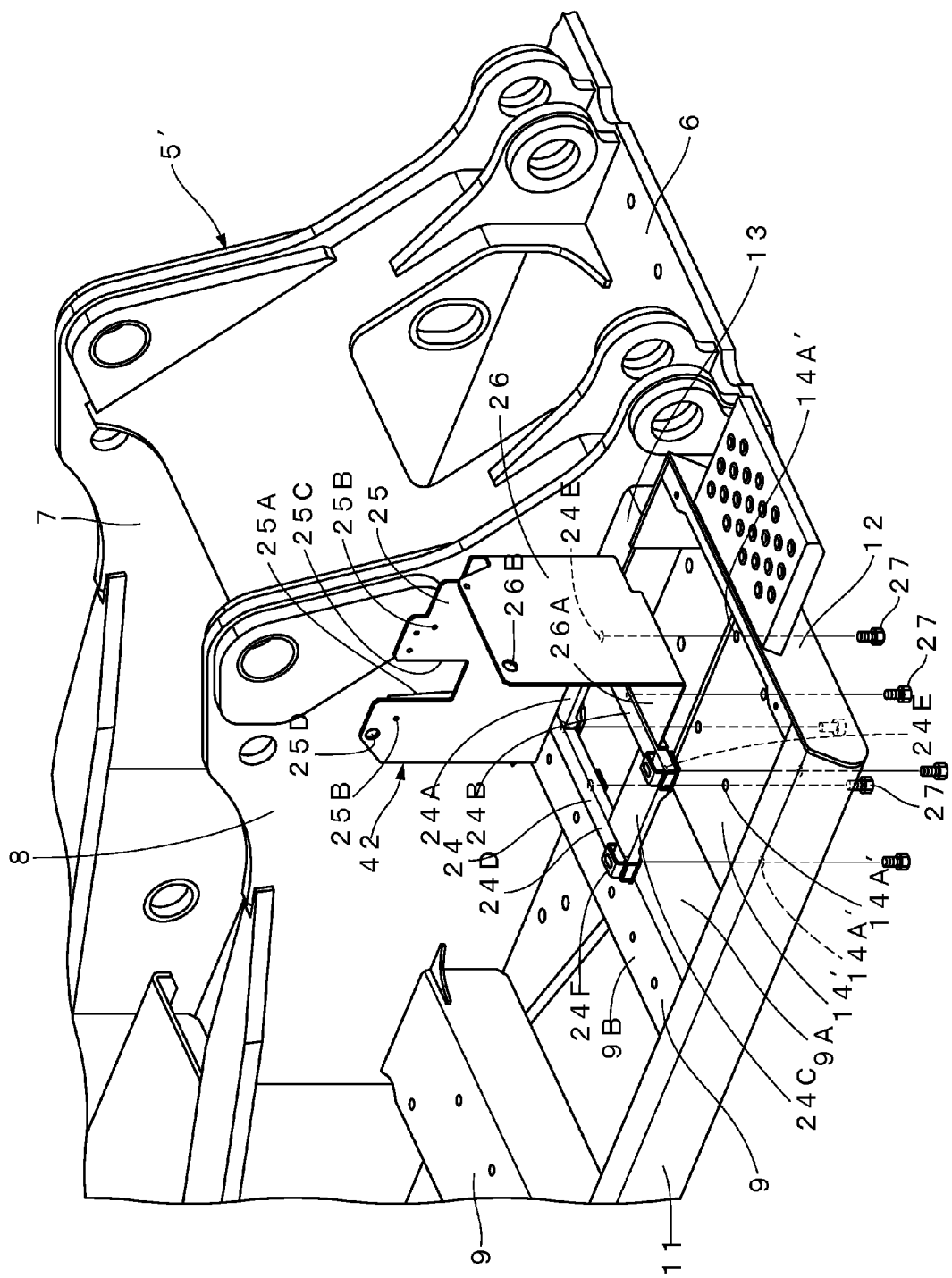
FIG. 15 is an exploded perspective view showing the mounting structure of the tank bracket with respect to the revolving frame according to the second embodiment.

However, as shown in FIG. 15, the revolving frame 5' according to the second embodiment is different from the revolving frame 5 according to the first embodiment in a point that six bolt through holes 14A' provided in the undercover 14' are arranged in the left-right direction three each at intervals in the front-rear direction.

Figure 16:
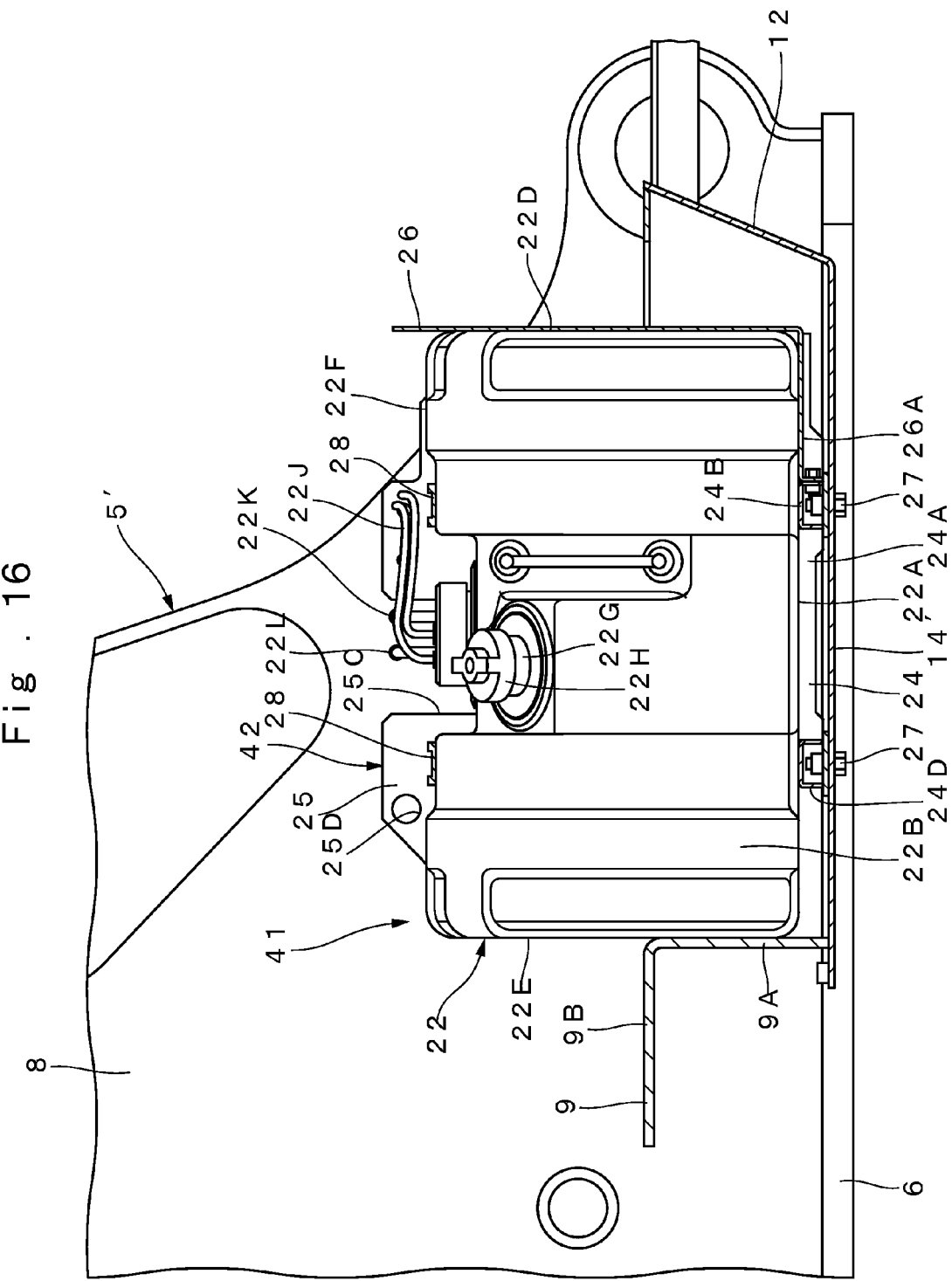
FIG. 16 is a sectional view showing the reduction agent tank in an outer shape and the revolving frame and the reduction agent tank subassembly as viewed in the direction of arrows XVI-XVI in FIG. 14.

Here, as shown in FIG. 16, the extension beam 9 arranged on the front right part is formed having an L-shaped section by the front side surface part 9A which becomes the rising surface part and the upper side surface part 9B bending from the upper part of the front side surface part 9A and extending to the rear side. In the second embodiment, the front side surface part 9A forming a part of the extension beam 9 is used as the rising surface part, and the configuration of fixing the reduction agent tank 22 which will be described later is realized.

A reduction agent tank subassembly 41 according to the second embodiment includes the aforementioned reduction agent tank 22, the fixing band 28, and a tank bracket 42 which will be described later substantially similarly to the reduction agent tank subassembly 21 according to the first embodiment. However, the reduction agent tank subassembly 41 is different from the reduction agent tank subassembly 21 according to the first embodiment in a point that the reduction agent tank 22 is fixed by being sandwiched between the tank bracket 42 and the extension beam 9 of the revolving frame 5.

Figure 17:
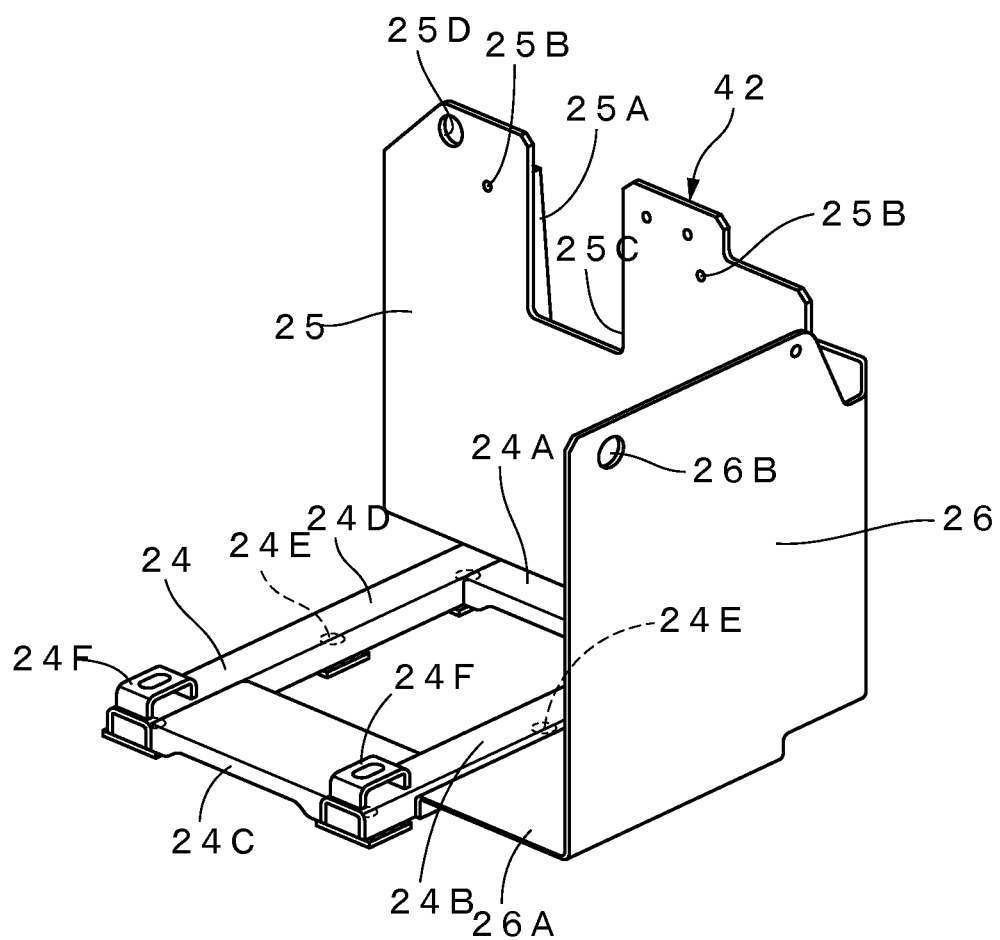
FIG. 17 is a perspective view of the tank bracket in FIG. 15 as a single unit as viewed from the upper side on the front right.

As shown in FIG. 17, the tank bracket 42 according to the second embodiment is configured by the bottom surface part 24, the first side surface part 25, and the second side surface part 26 similarly to the tank bracket 23 according to the first embodiment. However, as shown in FIG. 14, FIG. 15 and the like, the tank bracket 42 is different from the tank bracket 23 according to the first embodiment in a point that the first side surface part 25 is arranged on the left side (right vertical plate 8 side) and the second side surface part 26 is arranged on the front side (front side beam 12 side). That is, on the tank bracket 42, the reduction agent tank 22 is arranged in a laterally placed state so that the side surfaces 22D and 22E are located in the front-rear direction.

As shown in FIG. 16, the tank bracket 42 is arranged in a state in which the reduction agent tank 22 is sandwiched between the second side surface part 26 and the front side surface part 9A of the extension beam 9 forming the revolving frame 5'. On this, as shown in FIG. 15, by inserting the bolt 27 in each of the bolt through holes 14A' of the undercover 14' and by screwing this bolt 27 with each of the female screw holes 24E of the bottom surface part 24, the tank bracket 42 is fixed on the undercover 14'.

Here, in the second embodiment, the first frame body 24A of the bottom surface part 24 is arranged on the right vertical plate 8 side (inner side frame 13 side). As a result, in the tank bracket 42, the second frame body 24B is arranged at a position facing the front side beam 12 of the revolving frame 5', the third frame body 24C is arranged at a position facing the right side frame 11, and the fourth frame body 24D is arranged at a position facing the extension beam 9.

Thus, also in the second embodiment configured as above, the working effect substantially similar to the aforementioned first embodiment can be obtained. Particularly, according to the second embodiment, the reduction agent tank 22 can be fixed by using the extension beam 9 of the revolving frame 5'. Moreover, by directing the water supply port 22G of the reduction agent tank 22 to the right side, the urea water can be supplied from the right side of the revolving frame 5'.

Figure 18:
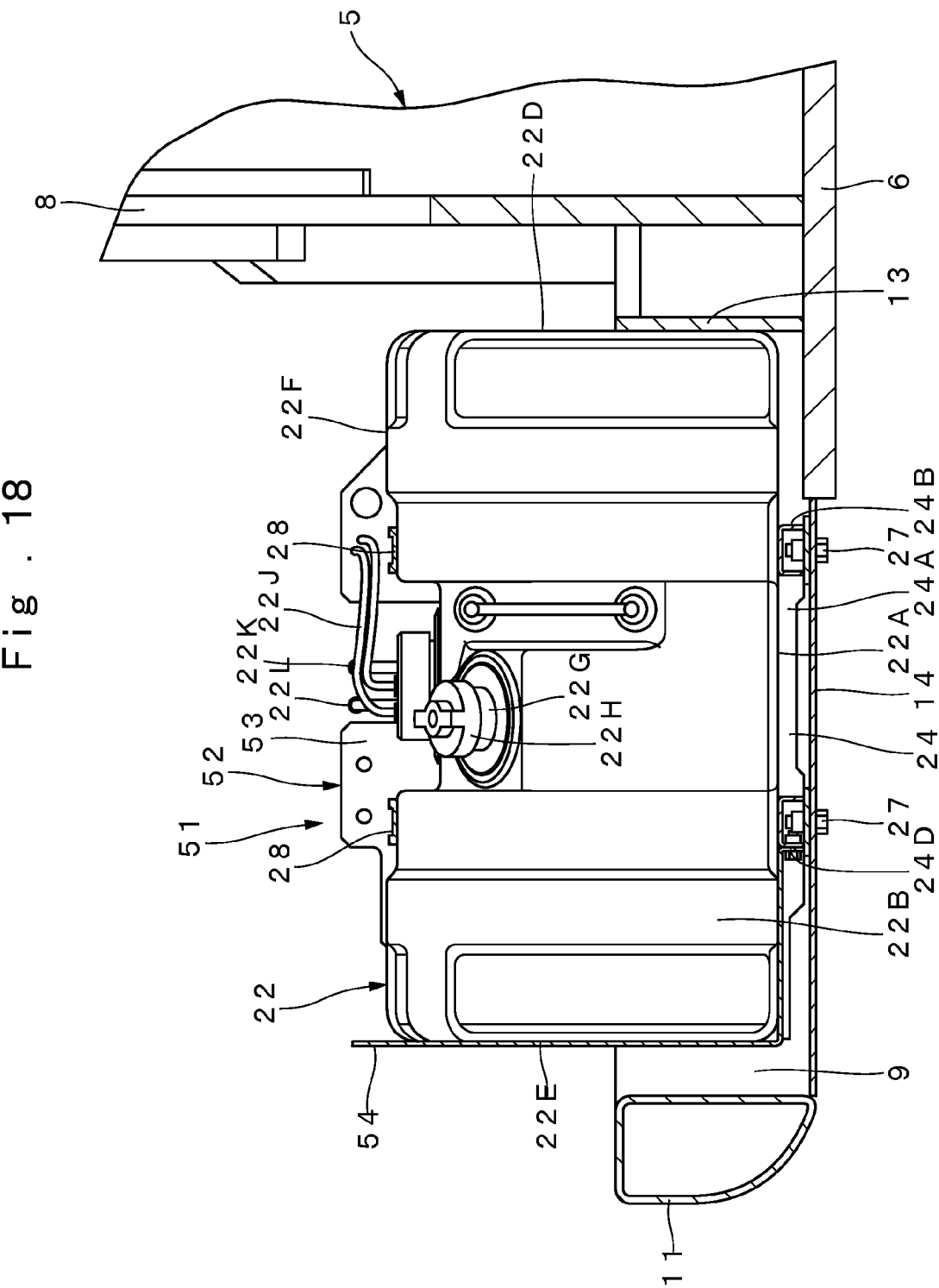
FIG. 18 is a sectional view of the revolving frame and the reduction agent tank subassembly according to a third embodiment as viewed from a position similar to FIG. 8.
Figure 19:
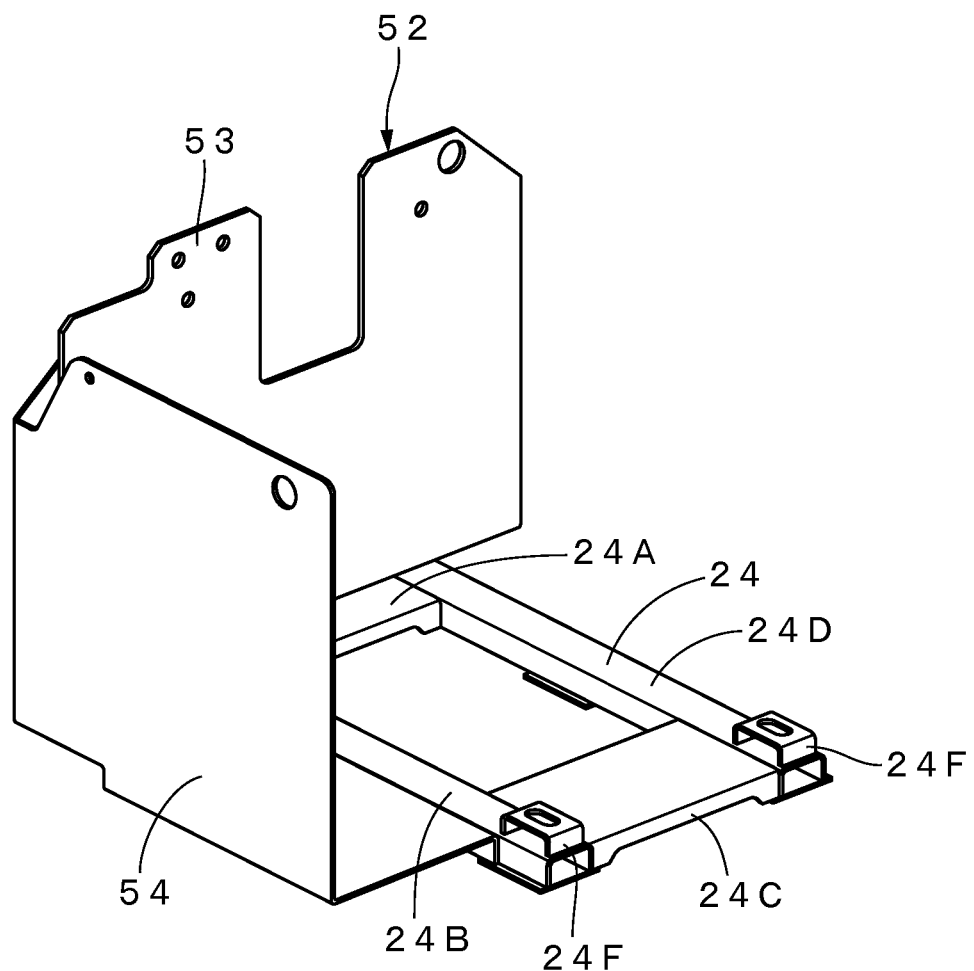
FIG. 19 is a perspective view of the tank bracket in FIG. 18 as viewed from the position similar to FIG. 12.

Next, FIG. 18 and FIG. 19 show a third embodiment of the present invention. A feature of this embodiment is configuration of fixing the reduction agent tank by using the inner side frame forming the revolving frame. It should be noted that in the third embodiment, the component elements that are identical to those of the foregoing first embodiment will be simply denoted by the same reference numerals to avoid repetitions of similar explanations.

In FIG. 18, the reduction agent tank subassembly 51 according to the third embodiment includes the aforementioned reduction agent tank 22, the fixing band 28, and a tank bracket 52 which will be described later substantially similarly to the reduction agent tank subassembly 21 according to the first embodiment. The reduction agent tank subassembly 51 according to the third embodiment is different from the reduction agent tank subassembly 21 according to the first embodiment in a point that a first side surface part 53 of the tank bracket 52 is arranged on the rear side (extension beam 9 side) and a second side surface part 54 is arranged on the right side (right side frame 11 side).

As shown in FIG. 19, the tank bracket 52 according to the third embodiment is configured by the aforementioned bottom surface part 24, a first side surface part 53, and a second side surface part 54 substantially similarly to the tank bracket 23 according to the first embodiment. However, the tank bracket 52 is different from the tank bracket 23 according to the first embodiment in a point that the second side surface part 54 is arranged on the right side. In this case, the reduction agent tank 22 is fixed by being sandwiched between the inner side frame 13 of the revolving frame 5 and the second side surface part 54 of the tank bracket 52. Further, in the third embodiment, in the pair of side surfaces 22D and 22E constituting the reduction agent tank 22, the side surface 22E located on the right side forms one side surface, while the side surface 22D located on the left side forms the other side surface.

That is, according to the tank bracket 52 according to the third embodiment, the first side surface part 53 is provided in the vertical direction by being supported by the first frame body 24A of the bottom surface part 24, and the second side surface part 54 is provided in the vertical direction by being supported by the second frame body 24B of the bottom surface part 24. The tank bracket 52 can be arranged in a state in which the reduction agent tank 22 is sandwiched between the second side surface part 54 and the inner side frame 13 as the rising surface part forming the revolving frame 5. On this, the tank bracket 52 is fixed to the undercover 14 by using the bolt 27.

Here, in the third embodiment, the first frame body 24A of the bottom surface part 24 is arranged on the front side (extension beam 9 side on the front right part) of the fuel tank 19. Moreover, the second frame body 24B is arranged at a position facing the right side frame 11 of the revolving frame 5, the third frame body 24C is arranged at a position facing the front side beam 12, and the fourth frame body 24D is arranged at a position facing the right vertical plate 8.

Thus, also in the third embodiment configured as above, the working effect substantially similar to the aforementioned first embodiment can be obtained. That is, according to the third embodiment, by using the inner side frame 13 forming the rising surface part of the revolving frame 5, the reduction agent tank 22 can be fixed by being sandwiched between this inner side frame 13 and the second side surface part 54 of the tank bracket 52.

It should be noted that in the first embodiment, the reduction agent tank 22 is constituted to be fixed by being sandwiched between the second side surface part 26 of the tank bracket 23 and the right side frame 11 forming a part of the revolving frame 5. Moreover, in the second embodiment, the reduction agent tank 22 is constituted to be fixed by being sandwiched between the second side surface part 26 of the tank bracket 23 and the extension beam 9 forming apart of the revolving frame 5'. Furthermore, in the third embodiment, the configuration in which the reduction agent tank 22 is fixed by being sandwiched between the second side surface part 54 of the tank bracket 52 and the inner side frame 13 forming a part of the revolving frame 5 is exemplified. However, the present invention is not limited to the same, and a constitution may be provided such that the reduction agent tank is fixed by being sandwiched between the side surface part of the tank bracket and another member forming a part of the revolving frame or a member mounted on the revolving frame such as the fuel tank, the hydraulic oil tank and the like, for example.

In each of the embodiments, the crawler-type hydraulic excavator 1 is described as an example of a construction machine. However, the present invention is not limited to the same, and may be applied to a wheel-type hydraulic excavator. Other than that, the present invention can be widely applied to other construction machines such as a hydraulic crane, a wheel loader and the like.

DESCRIPTION OF REFERENCE NUMERALS

1: Hydraulic excavator (Construction machine)
2: Lower traveling structure (Vehicle body)
3: Upper revolving structure (Vehicle body)
4: Working mechanism
5, 5': Revolving frame (Vehicle body frame)
9: Extension beam
9A: Front side surface part (Rising surface part)
11: Right side frame
11A: Inner side surface part (Rising surface part)
13: Inner side frame (Rising surface part)
15: Engine
20: Nox purifying device (Exhaust gas post-treatment device)
21, 41, 51: Reduction agent tank subassembly
22: Reduction agent tank
22A: Bottom surface
22B: Front surface
22C: Rear surface
22D: Side surface
22E: Side surface
22F: Upper surface
23, 42, 52: Tank bracket
24: Bottom surface part
24A: First frame body
24B: Second frame body
24C: Third frame body
24D: Fourth frame body
24E: Female screw hole (Bracket fixing portion)
25, 53: First side surface part
26, 54: Second side surface part
28: Fixing band

The invention claimed is:

1. A construction machine comprising:
a vehicle body frame forming a support structural body of a vehicle body, an engine mounted on said vehicle body frame, an exhaust gas post-treatment device connected to an exhaust side of said engine and performing post-treatment of an exhaust gas exhausted from said engine, and a reduction agent tank storing a reduction agent to be supplied to said exhaust gas post-treatment device, wherein:
a tank bracket holding said reduction agent tank on said vehicle body frame is provided;
said tank bracket is formed by a square-shaped bottom surface part having a first frame body, a second frame body, a third frame body, and a fourth frame body, a first side surface part supported by said first frame body of said bottom surface part and provided in a vertical direction, and a second side surface part supported by said second frame body adjacent to said first frame body in each of said frame bodies of said bottom surface part, provided in the vertical direction, and forming an L-shaped wall surface in collaboration with said first side surface part;
said tank bracket includes a bracket fixing portion located on said bottom surface part and fixing said tank bracket to said vehicle body frame;
a fixing band, connecting one of said first side surface part and said second side surface part to one of said first to fourth frame bodies forming said bottom surface part facing said one of said first side surface part and said second side surface part sandwiching said reduction agent tank and fixing said reduction agent tank between said bottom surface part and said one of said first side surface part and said second side surface part, is provided in said tank bracket; and
said tank bracket is fixed to said vehicle body frame by said bracket fixing portion in a state in which said reduction agent tank is fixed by being sandwiched by said one of said first side surface part and said second side surface part and a part of said vehicle body frame or a member mounted on said vehicle body frame.

2. The construction machine according to claim 1, wherein
a reduction agent tank subassembly is formed by fixing said reduction agent tank by using said fixing band with respect to said tank bracket, and said reduction agent tank subassembly is configured to be fixed to said vehicle body frame by using said bracket fixing portion.

3. The construction machine according to claim 1, wherein
a rising surface part rising in the vertical direction is provided on said vehicle body frame, and said reduction agent tank is configured to be fixed by being sandwiched by said one of said first side surface part and said second side surface part of said tank bracket and said rising surface part of said vehicle body frame.

4. The construction machine according to claim 1, wherein
  said reduction agent tank is formed as a container having a bottom surface,
  a front surface extending upward from one end edge of said bottom surface,
  a rear surface extending upward from another end edge of said bottom surface so as to face said front surface,
  a pair of side surfaces arranged facing each other on both sides of said bottom surface, said front surface, and said rear surface, and
  an upper surface forming a closed space inside among said bottom surface, said front surface, said rear surface, and said pair of side surfaces; and
  said reduction agent tank is arranged by having one side surface of said pair of side surfaces close to said one side surface part of said tank bracket and the other side surface arranged close to the part of said vehicle body frame or to the member mounted on said vehicle body frame.

* * * * *